US012039129B2

(12) United States Patent
Lee

(10) Patent No.: US 12,039,129 B2
(45) Date of Patent: Jul. 16, 2024

(54) ELECTRONIC DEVICE

(71) Applicant: SAMSUNG DISPLAY CO., LTD., Yongin-si (KR)

(72) Inventor: Soongyu Lee, Seoul (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 57 days.

(21) Appl. No.: 18/056,392

(22) Filed: Nov. 17, 2022

(65) Prior Publication Data

US 2023/0236695 A1 Jul. 27, 2023

(30) Foreign Application Priority Data

Jan. 25, 2022 (KR) .................. 10-2022-0011028
Apr. 19, 2022 (KR) .................. 10-2022-0048045

(51) Int. Cl.
G06F 3/041 (2006.01)
G06F 3/044 (2006.01)

(52) U.S. Cl.
CPC ........ *G06F 3/04166* (2019.05); *G06F 3/0446* (2019.05); *G06F 2203/04108* (2013.01)

(58) Field of Classification Search
CPC ............... G06F 3/04166; G06F 3/0446; G06F 2203/04108
See application file for complete search history.

(56) References Cited

U.S. PATENT DOCUMENTS

2016/0179273 A1* 6/2016 Lee .................. G06F 3/0412
345/174
2021/0200349 A1 7/2021 Mohamed et al.

FOREIGN PATENT DOCUMENTS

| JP | 4708278 | 6/2011 |
| KR | 10-2013-0078937 | 7/2013 |
| KR | 10-2043823 | 11/2019 |
| KR | 10-2021-0083909 | 7/2021 |

* cited by examiner

Primary Examiner — Michael Pervan
(74) Attorney, Agent, or Firm — F. Chau & Associates, LLC

(57) ABSTRACT

An electronic device includes a sensor layer including a plurality of first electrodes and a plurality of second electrodes, a sensor driving circuit driving the sensor layer and operating in a first or second mode, and a main driving circuit controlling an operation of the sensor driving circuit. In the first mode, the sensor driving circuit outputs a plurality of first transmit signals to the plurality of first electrodes respectively, receives a plurality of first sensing signals from the plurality of second electrodes respectively, and outputs the plurality of first sensing signals to the main driving circuit. In the second mode, the sensor driving circuit outputs a plurality of second transmit signals to the plurality of first electrodes respectively, receives a plurality of second sensing signals from the plurality of second electrodes respectively, and provides the main driving circuit with a coordinate based on the plurality of second sensing signals.

20 Claims, 17 Drawing Sheets

ELECTRONIC DEVICE

CROSS-REFERENCE TO RELATED APPLICATIONS

This U.S. non-provisional patent application claims priority under 35 U.S.C. § 119 to Korean Patent Applications No. 10-2022-0011028 filed on Jan. 25, 2022, and No. 10-2022-0048045 filed on Apr. 19, 2022, in the Korean Intellectual Property Office, the disclosures of which are incorporated by reference in their entireties herein.

1. Technical Field

Embodiments of the present disclosure described herein relate to an electronic device with a proximity sensing function.

2. Discussion of Related Art

Multimedia electronic devices such as a television, a mobile phone, a tablet computer, a navigation system, and a game console may display images, and support a touch-based input scheme, which allows a user to enter information or a command intuitively, conveniently, and easily. For example, in addition to typical input devices such as a button, a keyboard, and a mouse, the touch-based input scheme enables users to provide inputs with a finger, a stylus, or an electronic pen.

SUMMARY

Embodiments of the present disclosure provide an electronic device including a sensor layer with a proximity sensing function.

According to an embodiment, an electronic device includes a display layer that displays an image, a display driving circuit that drives the display layer, a sensor layer that is disposed on the display layer and includes a plurality of first electrodes and a plurality of second electrodes, a sensor driving circuit that drives the sensor layer and selectively operates in a first mode or a second mode different from the first mode, and a main driving circuit that controls an operation of the display driving circuit and an operation of the sensor driving circuit. In the first mode, the sensor driving circuit outputs a plurality of first transmit signals to the plurality of first electrodes respectively, receives a plurality of first sensing signals from the plurality of second electrodes respectively, and outputs the plurality of first sensing signals to the main driving circuit. In the second mode, the sensor driving circuit outputs a plurality of second transmit signals to the plurality of first electrodes respectively, receives a plurality of second sensing signals from the plurality of second electrodes respectively, and provides the main driving circuit with a coordinate obtained based on the plurality of second sensing signals. The plurality of first transmit signals may be simultaneously output to the plurality of first electrodes.

The plurality of first transmit signals may be in phase with one another.

A driving voltage of the plurality of first transmit signals may be equal to a driving voltage of the plurality of second transmit signals.

A first phase of one second transmit signal of the plurality of second transmit signals may be different from a second phase of remaining second transmit signals of the plurality of second transmit signals.

The first mode may include a first sub mode and a second sub mode. In the first sub mode, the sensor driving circuit may output the plurality of first sensing signals to the main driving circuit. In the second sub mode, the sensor driving circuit may output a plurality of third transmit signals to the plurality of first electrodes respectively, may receive a plurality of third sensing signals from the plurality of second electrodes respectively, and may provide the main driving unit with a proximity coordinate obtained based on the plurality of third sensing signals.

A length of an operating period in the first sub mode may be longer than a length of an operating period in the second sub mode.

A frequency of each of the plurality of third transmit signals may be higher than a frequency of each of the plurality of first transmit signals.

The sensor driving circuit may operate in the first sub mode and may then continue to operate in the second sub mode or operates in the second sub mode and then continues to operate in the first sub mode.

The main driving circuit may include a noise model that is trained to predict a noise included in the plurality of first sensing signals, and a decision model that determines whether an object approaches, based on the noise predicted by the noise model and the plurality of first sensing signals.

The noise model may include a plurality of noise prediction models that respectively output a plurality of noise prediction values, and a selector that selects one of the plurality of noise prediction values.

Each of the plurality of noise prediction models may include a moving window that receives the plurality of first sensing signals of each of a plurality of frames, a moving averaging unit that calculates a moving average of the plurality of first sensing signals of each of the plurality of frames and outputs an intermediate signal, and a noise predictor that outputs a noise prediction value by using the intermediate signal and a trained algorithm.

The display layer may include a base layer, a circuit layer disposed on the base layer, a light emitting device layer disposed on the circuit layer, and an encapsulation layer disposed on the light emitting device layer, and the sensor layer may be directly disposed on the display layer.

According to an embodiment, an electronic device includes a sensor layer that includes a plurality of first electrodes and a plurality of second electrodes, a sensor driving unit that drives the sensor layer and selectively operates in a proximity sensing mode or a touch sensing mode, and a main driving circuit that controls an operation of the sensor driving circuit. In the proximity sensing mode, the sensor driving circuit outputs all of a plurality of first sensing signals received from the plurality of second electrodes to the main driving circuit. In the touch sensing mode, the sensor driving circuit calculates input coordinates based on a plurality of second sensing signals received from the plurality of second electrodes and outputs a coordinate signal including information about the input coordinates to the main driving circuit.

The main driving circuit includes a noise model that is trained to predict a noise included in the plurality of first sensing signals, and a decision model that determines whether an object approaches, based on the noise predicted by the noise model and the plurality of first sensing signals.

In the proximity sensing mode, the sensor driving circuit may simultaneously output a plurality of first transmit signals to the plurality of first electrodes respectively and may receive the plurality of first sensing signals from the plurality of second electrodes respectively, and the plurality of first transmit signals may be in phase.

In the touch sensing mode, the sensor driving circuit may simultaneously output a plurality of second transmit signals to the plurality of first electrodes respectively and may receive the plurality of second sensing signals from the plurality of second electrodes respectively, and a first phase of one second transmit signal of the plurality of second transmit signals may be different from a second phase of the remaining second transmit signals.

A driving voltage of the plurality of first transmit signals may be equal to a driving voltage of the plurality of second transmit signals.

The sensor driving circuit may selectively operate in one of the proximity sensing mode, the touch sensing mode, or a proximity coordinate sensing mode, and the sensor driving circuit may operate in the proximity sensing mode and may then continue to operate in the proximity coordinate sensing mode or operates in the proximity coordinate sensing mode and then continues to operate in the proximity sensing mode.

In the proximity coordinate sensing mode, the sensor driving circuit may output a plurality of third transmit signals to the plurality of first electrodes respectively, may receive a plurality of third sensing signals from the plurality of second electrodes respectively, and may provide the main driving circuit with a proximity coordinate signal obtained based on the plurality of third sensing signals.

A length of an operating period in the proximity sensing mode may be longer than a length of an operating period in the proximity coordinate sensing mode, and a frequency of each of the plurality of third transmit signals may be higher than a frequency of each of the plurality of first transmit signals.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
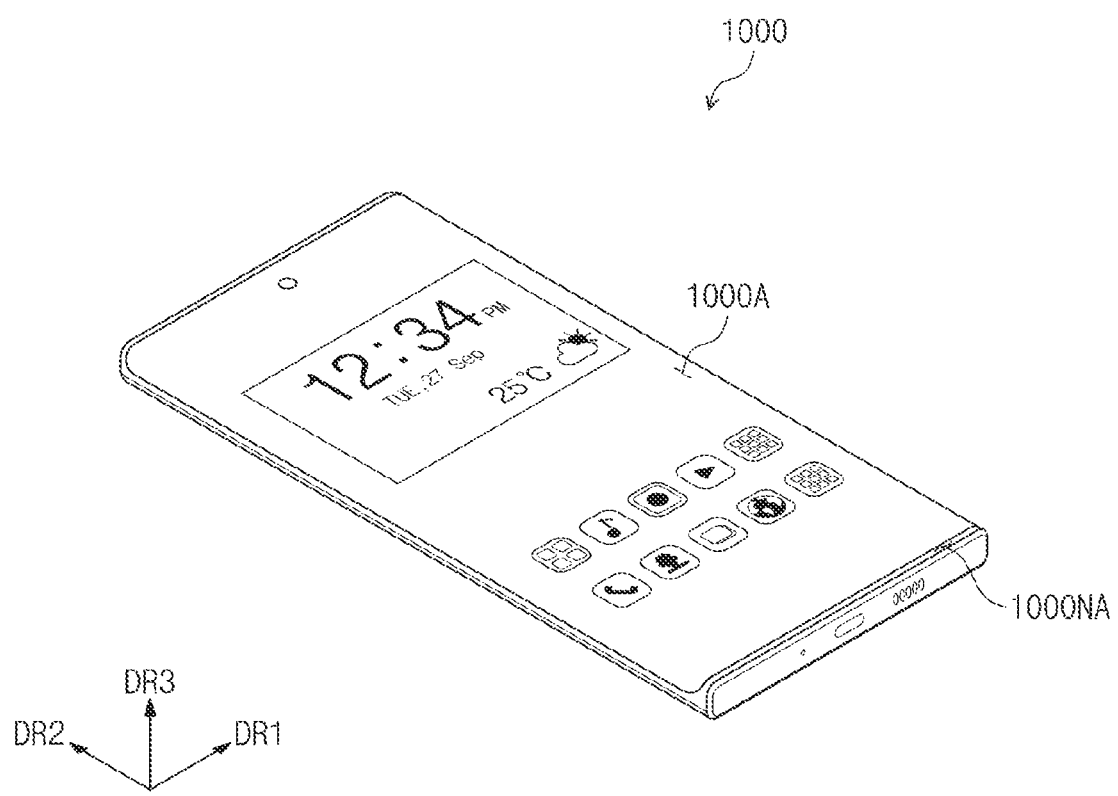
FIG. 1 is a perspective view of an electronic device according to an embodiment of the present disclosure.

In the specification, the expression that a first component (or area, layer, part, portion, etc.) is "on", "connected with", or "coupled to" a second component means that the first component is directly on, connected with, or coupled to the second component or means that a third component is disposed therebetween.

Like reference numerals refer to like components. It is to be understood that in the drawings, the relative thicknesses, proportions, angles, and dimensions of components are intended to be drawn to scale for at least one embodiment of the present disclosure, however, changes may be made to these characteristics within the scope of the present disclosure and the present inventive concept is not necessarily limited to the properties shown. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the invention, a first component may be referred to as a "second component", and similarly, the second component may be referred to as the "first component". The singular forms are intended to include the plural forms unless the context clearly indicates otherwise.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

The terms "part" and "unit" mean a software component or a hardware component that performs a specific function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and working components, and may include processes, functions, properties, procedures, subroutines, program code segments, drivers, firmwares, micro-codes, circuits, data, databases, data structures, tables, arrays or variables.

Below, embodiments of the present disclosure will be described with reference to accompanying drawings.

FIG. 1 is a perspective view illustrating an electronic device 1000 according to an embodiment of the present disclosure.

Referring to FIG. 1, the electronic device 1000 may be a device that is activated depending on an electrical signal. For example, the electronic device 1000 may include a mobile phone, a foldable mobile phone, a notebook, a television, a tablet, a car navigation system, a game console, or a wearable device, but the present disclosure is not limited thereto. An example in which the electronic device 1000 is a smartphone is illustrated in FIG. 1.

An active area 1000A and a peripheral area (or non-active area) 1000NA may be defined in the electronic device 1000. The electronic device 1000 may display an image through the active area 1000A. The active area 1000A may include a surface defined by a first direction DR1 and a second direction DR2. The peripheral area 1000NA may surround the active area 1000A.

A thickness direction of the electronic device 1000 may be parallel to a third direction DR3 intersecting the first direction DR1 and the second direction DR2. Accordingly, front surfaces (or top surfaces) and rear surfaces (or bottom surfaces) of members constituting the electronic device 1000 may be defined with respect to the third direction DR3.

Figure 2:
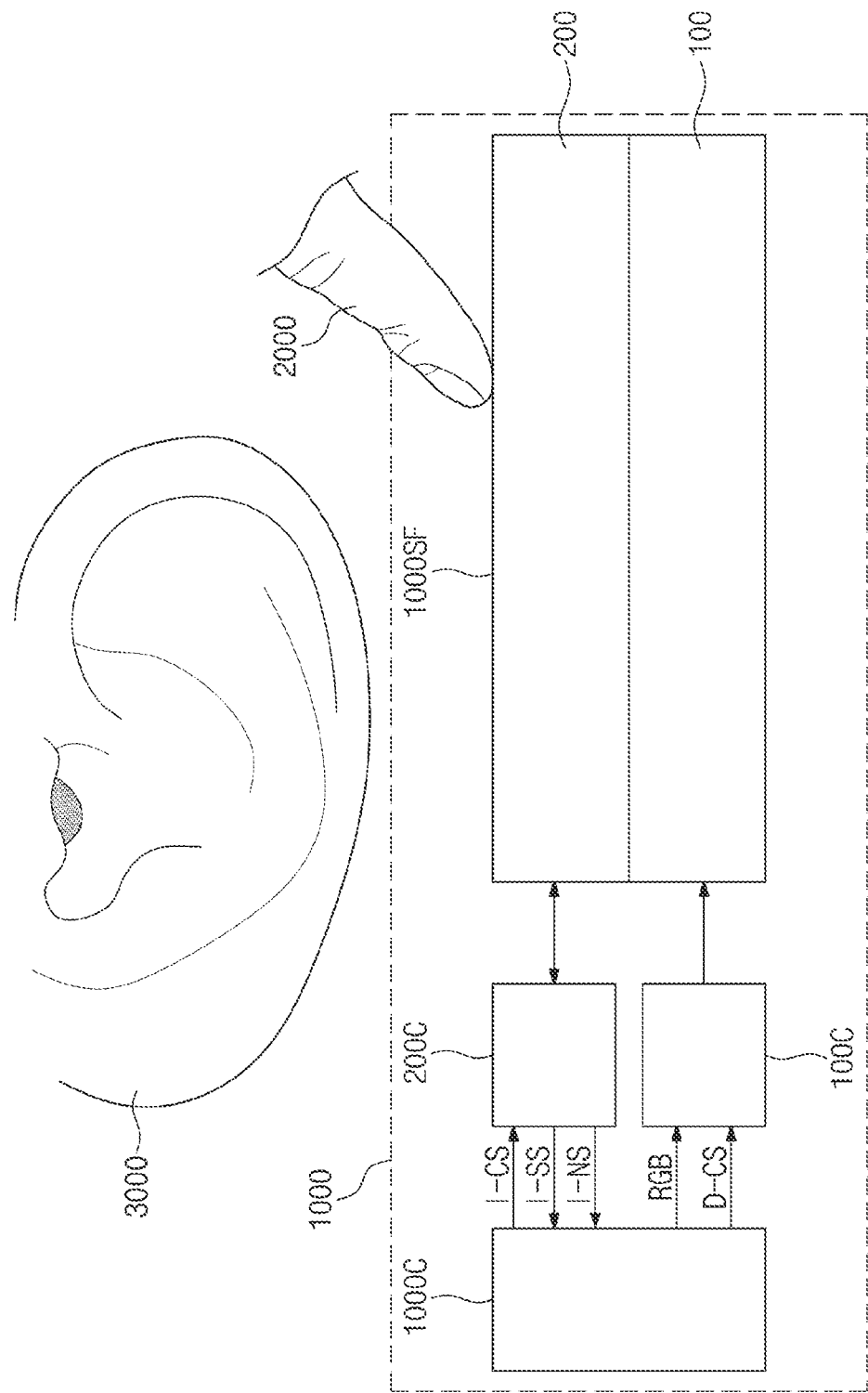
FIG. 2 is a diagram describing an operation of an electronic device according to an embodiment of the present disclosure.

FIG. 2 is a diagram for describing an operation of the electronic device 1000 according to an embodiment of the present disclosure.

Referring to FIG. 2, the electronic device 1000 may include a display layer 100, a sensor layer 200, a display driving unit 100C (e.g., a driving circuit), a sensor driving unit 200C (e.g., a driving circuit), and a main driving unit 1000C (e.g., a driving circuit).

The display layer 100 may be a component that substantially generates an image. The display layer 100 may be a light emitting display layer. For example, the display layer 100 may be an organic light emitting display layer, an inorganic light emitting display layer, an organic-inorganic display layer, a quantum dot display layer, a micro-LED display layer, or a nano-LED display layer.

The sensor layer 200 may be disposed on the display layer 100. The sensor layer 200 may sense an external input (e.g., 2000 or 3000) applied from the outside. The external input 2000 or 3000 may include all the input means capable of providing a change in capacitance. For example, the sensor layer 200 may sense an input by an active-type input means providing a driving signal, in addition to a passive-type input means such as a body of the user.

The main driving unit 1000C may control an overall operation of the electronic device 1000. For example, the main driving unit 1000C may control operations of the display driving unit 100C and the sensor driving unit 200C. The main driving unit 1000C may include at least one microprocessor. Also, the main driving unit 1000C may further include a graphics processor. The main driving unit 1000C may be referred to as an "application processor", a "central processing unit", or a "main processor".

The display driving unit 100C may drive the display layer 100. The display driving unit 100C may receive image data RGB and a control signal D-CS from the main driving unit 1000C. The control signal D-CS may include various signals. For example, the control signal D-CS may include an input vertical synchronization signal, an input horizontal synchronization signal, a main clock, a data enable signal, and the like. The display driving unit 100C may generate a vertical synchronization signal and a horizontal synchronization signal for controlling a timing to provide a signal to the display layer 100, based on the control signal D-CS. For example, the provided signal may be based on the image data RGB.

The sensor driving unit 200C may drive the sensor layer 200. The sensor driving unit 200C may receive a control signal I-CS from the main driving unit 1000C. The control signal I-CS may include a mode decision signal that determines a driving mode of the sensor driving unit 200C. The control signal I-CS may further include a clock signal.

The sensor driving unit 200C may calculate coordinate information of an input based on a signal received from the sensor layer 200 and may provide a coordinate signal I-SS including the coordinate information to the main driving unit 1000C. The coordinate information may include a position on the display layer touched by a user. The main driving unit 1000C executes an operation corresponding to the user input based on the coordinate signal I-SS. For example, the main driving unit 1000C may drive the display driving unit 100C such that a new application image is displayed on the display layer 100.

The sensor driving unit 200C may provide the main driving unit 1000C with an event signal I-NS by the object 3000, which is spaced from a surface 1000SF of the electronic device 1000, based on a signal received from the sensor layer 200. The spaced object 3000 may be referred to as a "hovering object". An ear of the user that comes close to the electronic device 1000 is illustrated as an example of the spaced object 3000, but the present disclosure is not limited thereto.

The main driving unit 1000C may receive and process the event signal I-NS to calculate a processing result and may determine a proximity touch has occurred based on the processing result. For example, the main driving unit 1000C may predict a noise of the event signal I-NS by using an artificial intelligence algorithm and may determine whether a proximity touch has occurred. That is, the event signal I-NS may be raw data. According to an embodiment of the present disclosure, data processing for the event signal I-NS may not be performed by the sensor driving unit 200C, but it may be performed by the main driving unit 1000C after the event signal I-NS is provided to the main driving unit 1000C. Accordingly, compared to the case of providing a signal including coordinate information, the amount of data to be provided to the main driving unit 1000C may increase in the case of providing the event signal I-NS.

The main driving unit 1000C may process the event signal I-NS by using the artificial intelligence algorithm and then may determine whether the object 3000 is sensed. Afterwards, the main driving unit 1000C may control the display driving unit 100C based on a determination result such that luminance of an image to be displayed in the display layer 100 decreases or an image is not displayed in the display layer 100. That is, the main driving unit 1000C may turn off the display layer 100.

Also, in an embodiment, when it is determined that the object 3000 is sensed, the main driving unit 1000C may enter a sleep mode. Even though the main driving unit 1000C enters the sleep mode, the sensor layer 200 and the sensor driving unit 200C may maintain operations thereof. Accordingly, in the event that the object 3000 is separated from the surface 1000SF of the electronic device 1000, the sensor driving unit 200C may determine the event has occurred and may provide the main driving unit 1000C with a signal releasing the sleep mode of the main driving unit 1000C.

Figure 3:
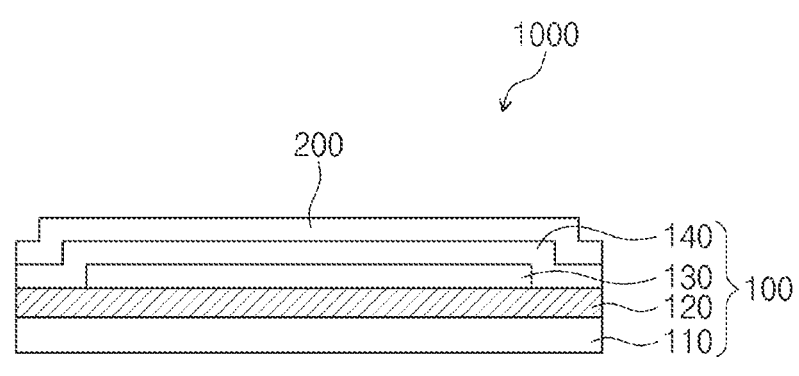
FIG. 3 is a schematic cross-sectional view of an electronic device, according to an embodiment of the present disclosure.
Figure 3:
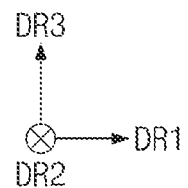

FIG. 3 is a schematic cross-sectional view of the electronic device 1000 according to an embodiment of the present disclosure.

Referring to FIG. 3, the electronic device 1000 may include the display layer 100 and the sensor layer 200 disposed on the display layer 100. The display layer 100 may be referred to as a "display panel" or may be referred to as a "sensor or input sensing layer of the sensor layer 200".

The display layer 100 may include a base layer 110, a circuit layer 120, a light emitting device layer 130, and an encapsulation layer 140.

The base layer 110 may be a member that provides a base surface on which the circuit layer 120 is disposed. The base layer 110 may be a glass substrate, a metal substrate, a polymer substrate, or the like. However, embodiments of the disclosure are not limited thereto, and the base layer 110 may be an inorganic layer, an organic layer, or a composite material layer.

The base layer 110 may have a multi-layer structure. For example, the base layer 110 may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be collectively referred to as a "base barrier layer".

Each of the first and second synthetic resin layers may include a polyimide-based resin. Also, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. Meanwhile, the expression "~~-based resin" in the specification indicates that "~~-based resin" includes the functional group of "~~".

The circuit layer 120 may be disposed on the base layer 110. The circuit layer 120 may include an insulating layer, a semiconductor pattern, a conductive pattern, a signal line, and the like. An insulating layer, a semiconductor layer, and a conductive layer may be formed on the base layer 110 by a coating or deposition process, and the insulating layer, the semiconductor layer, and the conductive layer may then be selectively patterned through a plurality of photolithography processes. Afterwards, the semiconductor pattern, the conductive pattern, and the signal line that are included in the circuit layer 120 may be formed.

The light emitting device layer 130 may be disposed on the circuit layer 120. The light emitting device layer 130 may include a light emitting device. For example, the light emitting device layer 130 may include an organic light emitting material, an inorganic light emitting material, an organic-inorganic light emitting material, a quantum dot, a quantum rod, a micro-LED, or a nano-LED.

The encapsulation layer 140 may be disposed on the light emitting device layer 130. The encapsulation layer 140 may protect the light emitting device layer 130 from foreign substances such as moisture, oxygen, and dust particles.

The sensor layer 200 may be disposed on the display layer 100. The sensor layer 200 may sense an external input applied from the outside. The external input may be an input of the user. The user input may include various types of external inputs such as a part of a user body, light, heat, a pen, or pressure.

The sensor layer 200 may be formed on the display layer 100 through a successive process. In this case, the expression "the sensor layer 200 is directly disposed on the display layer 100" may be possible. Here, the expression "directly disposed" may mean that a third component is not interposed between the sensor layer 200 and the display layer 100. That is, a separate adhesive member is not interposed between the sensor layer 200 and the display layer 100.

A noise coming from the display layer 100 may be included in a signal provided from the sensor layer 200. For example, a change in the noise included in the signal provided from the sensor layer 200 when a screen displayed in the display layer 100 changes may be greater than that when a screen displayed in the display layer 100 is in a still or non-moving state. According to an embodiment of the present disclosure, the main driving unit 1000C (refer to FIG. 2) predicts a noise of a signal provided from the sensor layer 200 by using an artificial intelligence algorithm and determines whether a proximity touch has occurred. As such, the accuracy of a proximity decision may be increased.

The electronic device 1000 may further include an anti-reflection layer and an optical layer on the sensor layer 200. The anti-reflection layer may reduce the reflectance of an external light incident from the outside of the electronic device 1000. The optical layer may increase the front luminance of the electronic device 1000 by controlling a direction of a light incident from the display layer 100.

Figure 4:
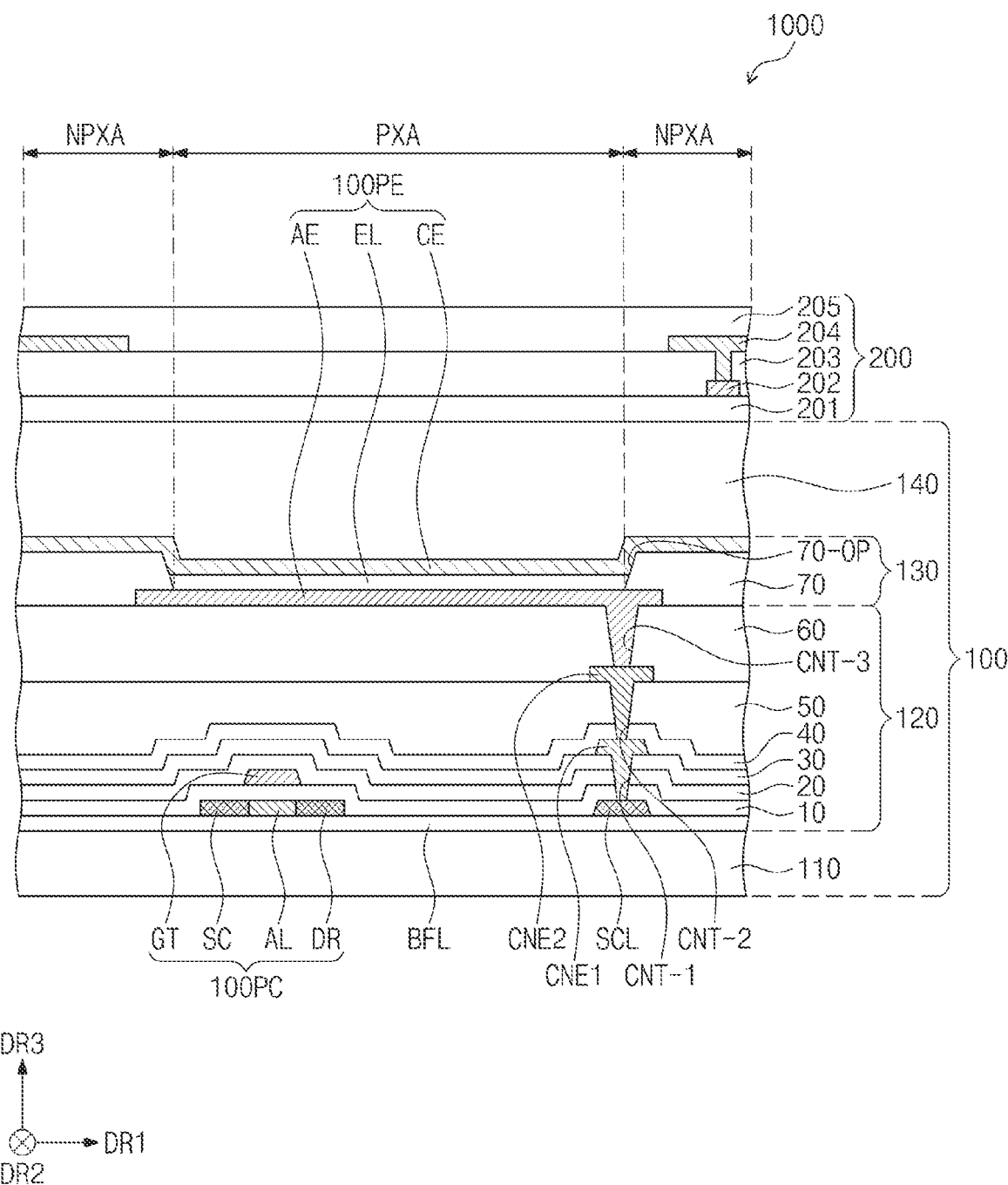
FIG. 4 is a cross-sectional view of an electronic device according to an embodiment of the present disclosure.

FIG. 4 is a cross-sectional view of an electronic device according to an embodiment of the present disclosure.

Referring to FIG. 4, at least one inorganic layer is formed on an upper surface of the base layer 110. The inorganic layer may include at least one of aluminum oxide, titanium oxide, silicon oxide, silicon nitride, silicon oxynitride, zirconium oxide, and hafnium oxide. The inorganic layer may be formed of multiple layers. The multiple inorganic layers may constitute a barrier layer and/or a buffer layer. In this embodiment, the display layer 100 is illustrated as including a buffer layer BFL.

The buffer layer BFL may increase a bonding force between the base layer 110 and a semiconductor pattern. The buffer layer BFL may include at least one of silicon oxide, silicon nitride, and silicon oxynitride. For example, the buffer layer BFL may include a structure in which a silicon oxide layer and a silicon nitride layer are stacked alternately.

The semiconductor pattern may be disposed on the buffer layer BFL. The semiconductor pattern may include polysilicon. However, the present disclosure is not limited thereto, and the semiconductor pattern may include amorphous silicon, low-temperature polycrystalline silicon, or oxide semiconductor.

FIG. 4 only illustrates a portion of the semiconductor pattern, and the semiconductor pattern may be further disposed in another area. Semiconductor patterns may be arranged across pixels in a specific rule. An electrical property of the semiconductor pattern may vary depending on whether it is doped or not. The semiconductor pattern may include a first area having higher conductivity and a second area having lower conductivity. The first area may be doped with an N-type dopant or a P-type dopant. A P-type transistor may include a doping area doped with the P-type dopant, and an N-type transistor may include a doping area doped with the N-type dopant. The second area may be a non-doping area or may be an area doped at a lower concentration than the first area.

The conductivity of the first area may be greater than the conductivity of the second area, and the first area may substantially serve as an electrode or a signal line. The second area may substantially correspond to an active (or channel) of a transistor. In other words, a portion of the semiconductor pattern may be an active of a transistor, another portion thereof may be a source or a drain of the transistor, and another portion thereof may be a connection electrode or a connection signal line.

Each of pixels may be expressed by an equivalent circuit including 7 transistors, one capacitor, and a light emitting device, and the equivalent circuit of the pixel may be modified in various forms. One transistor 100PC and one light emitting device 100PE that are included in one pixel are illustrated in FIG. 4 as an example.

A source area SC, an active area AL, and a drain area DR of the transistor 100PC may be formed from the semiconductor pattern. The source area SC and the drain area DR may extend in directions opposite to each other from the active area AL in a cross-sectional view. A portion of a connection signal line SCL forming from the semiconductor pattern is illustrated in FIG. 4. Although not separately illustrated, the connection signal line SCL may be connected to the drain area DR of the transistor 100PC in a plan view.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer, and may have a single-layer or multi-layer structure. The first insulating layer 10 may include at least one of aluminum oxide, titanium oxide, silicon oxide, silicon nitride, silicon oxynitride, zirconium oxide, and a hafnium oxide. In this embodiment, the first insulating layer 10 may be a silicon oxide layer having a single layer. As well as the first insulating layer 10, an insulating layer of the circuit layer 120 to be described later may be an inorganic layer and/or an organic layer, and may have a single-layer or multi-layer structure. The inorganic layer may include at least one of the materials described above but is not limited thereto.

A gate GT of the transistor 100PC is disposed on the first insulating layer 10. The gate GT may be a portion of a metal pattern. The gate GT overlaps the active area AL. The gate GT may function as a mask in the process of doping the semiconductor pattern.

A second insulating layer 20 may be disposed on the first insulating layer 10 and may cover the gate GT. The second insulating layer 20 may overlap the pixels in common. The second insulating layer 20 may be an inorganic layer and/or an organic layer, and may have a single-layer or multi-layer structure. The second insulating layer 20 may include at least one of silicon oxide, silicon nitride, and silicon oxynitride. In this embodiment, the second insulating layer 20 may have a multi-layer structure including a silicon oxide layer and a silicon nitride layer.

The third insulating layer 30 may be disposed on the second insulating layer 20. The third insulating layer 30 may have a single-layer or multi-layer structure. In this embodiment, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer. A second connection electrode CNE2 may be disposed on the fifth insulating layer 50. The second connection electrode CNE2 may be connected with the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting device layer 130 may be disposed on the circuit layer 120. The light emitting device layer 130 may include the light emitting device 100PE. For example, the light emitting device layer 130 may include an organic light emitting material, an inorganic light emitting material, an organic-inorganic light emitting material, a quantum dot, a quantum rod, a micro-LED, or a nano-LED. Below, an example in which the light emitting device 100PE is an organic light emitting device will be described, but the light emitting device 100PE is not specifically limited thereto.

The light emitting device 100PE may include a first electrode (or an anode electrode) AE, a light emitting layer EL, and a second electrode (or a cathode electrode) CE.

The first electrode AE may be disposed on the sixth insulating layer 60. The first electrode AE may be connected with the second connection electrode CNE2 through a contact hole CNT-3 penetrating the sixth insulating layer 60.

A pixel defining layer 70 may be disposed on the sixth insulating layer 60 and may cover a part of the first electrode AE. An opening 70-OP is defined in the pixel defining layer 70. The opening 70-OP of the pixel defining layer 70 exposes at least a portion of the first electrode AE.

The active area 1000A (refer to FIG. 1) may include a light emitting area PXA and a non-light emitting area NPXA adjacent to the light emitting area PXA. The non-light emitting area NPXA may surround the light emitting area PXA. In this embodiment, the light emitting area PXA is defined to correspond to a partial area of the first electrode AE, which is exposed by the opening 70-OP.

The emission layer EL may be disposed on the first electrode AE. The emission layer EL may be disposed in an area defined by the opening 70-OP. That is, the emission layer EL may be independently disposed for each pixel. In the case where the emission layers EL are independently disposed for each pixel, each of the emission layers EL may emit a light of at least one of a blue color, a red color, and a green color. However, the present disclosure is not limited thereto. For example, the emission layer EL may be provided to be connected in common with the pixels. In this case, the emission layer EL may provide a blue color or may provide a white color.

The second electrode CE may be disposed on the emission layer EL. The second electrode CE may be integrally disposed in a plurality of pixels in common.

A hole control layer may be interposed between the first electrode AE and the emission layer EL. The hole control layer may be disposed in common in the light emitting area PXA and the non-light emitting area NPXA. The hole control layer may include a hole transport layer and may further include a hole injection layer. An electron control layer may be interposed between the emission layer EL and the second electrode CE. The electron control layer may include an electron transport layer and may further include an electron injection layer. The hole control layer and the electron control layer may be formed in common at a plurality of pixels by using an open mask.

The encapsulation layer 140 may be disposed on the light emitting device layer 130. The encapsulation layer 140 may include an inorganic layer, an organic layer, and an inorganic layer sequentially stacked, and layers constituting the encapsulation layer 140 are not limited thereto.

The inorganic layers may protect the light emitting device layer 130 from moisture and oxygen, and the organic layer may protect the light emitting device layer 130 from a foreign material such as dust particles. The inorganic layers may include a silicon nitride layer, a silicon oxynitride layer, a silicon oxide layer, a titanium oxide layer, or an aluminum oxide layer. The organic layer may include an acrylic-based organic layer but is not limited thereto.

The sensor layer 200 may include a sensor base layer 201, a first conductive layer 202, a sensing insulating layer 203, a second conductive layer 204, and a cover insulating layer 205.

The sensor base layer 201 may be an inorganic layer including at least one of silicon nitride, silicon oxynitride, and silicon oxide. Alternatively, the sensor base layer 201 may be an organic layer including epoxy resin, acrylate resin, or imide-based resin. The sensor base layer 201 may have a single-layer structure or may have a multi-layer structure in which multiple layers are stacked in the third direction DR3.

Each of the first conductive layer 202 and the second conductive layer 204 may have a single-layer structure or may have a multi-layer structure in which a plurality of layers are stacked in the third direction DR3.

Each of the first conductive layer 202 and the second conductive layer 204 that have a single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include conductive polymer such as PEDOT, metal nanowire, or graphene.

Each of the first conductive layer 202 and the second conductive layer 204 that have a multi-layer structure may include metal layers. The metal layers may have, for example, a three-layer structure of titanium/aluminum/titanium. The conductive layer of the multi-layer structure may include at least one metal layer and at least one transparent conductive layer.

At least one of the sensing insulating layer 203 and the cover insulating layer 205 may include an inorganic layer. The inorganic layer may include at least one of aluminum oxide, titanium oxide, silicon oxide, silicon nitride, silicon oxynitride, zirconium oxide, and hafnium oxide.

At least one of the sensing insulating layer 203 and the cover insulating layer 205 may include an organic layer. The organic film may include at least one of an acrylic-based resin, a methacrylic-based resin, a polyisoprene, a vinyl-based resin, an epoxy-based resin, a urethane-based resin, a cellulose-based resin, a siloxane-based resin, a polyimide-based resin, a polyamide-based resin, and a perylene-based resin.

Figure 5:
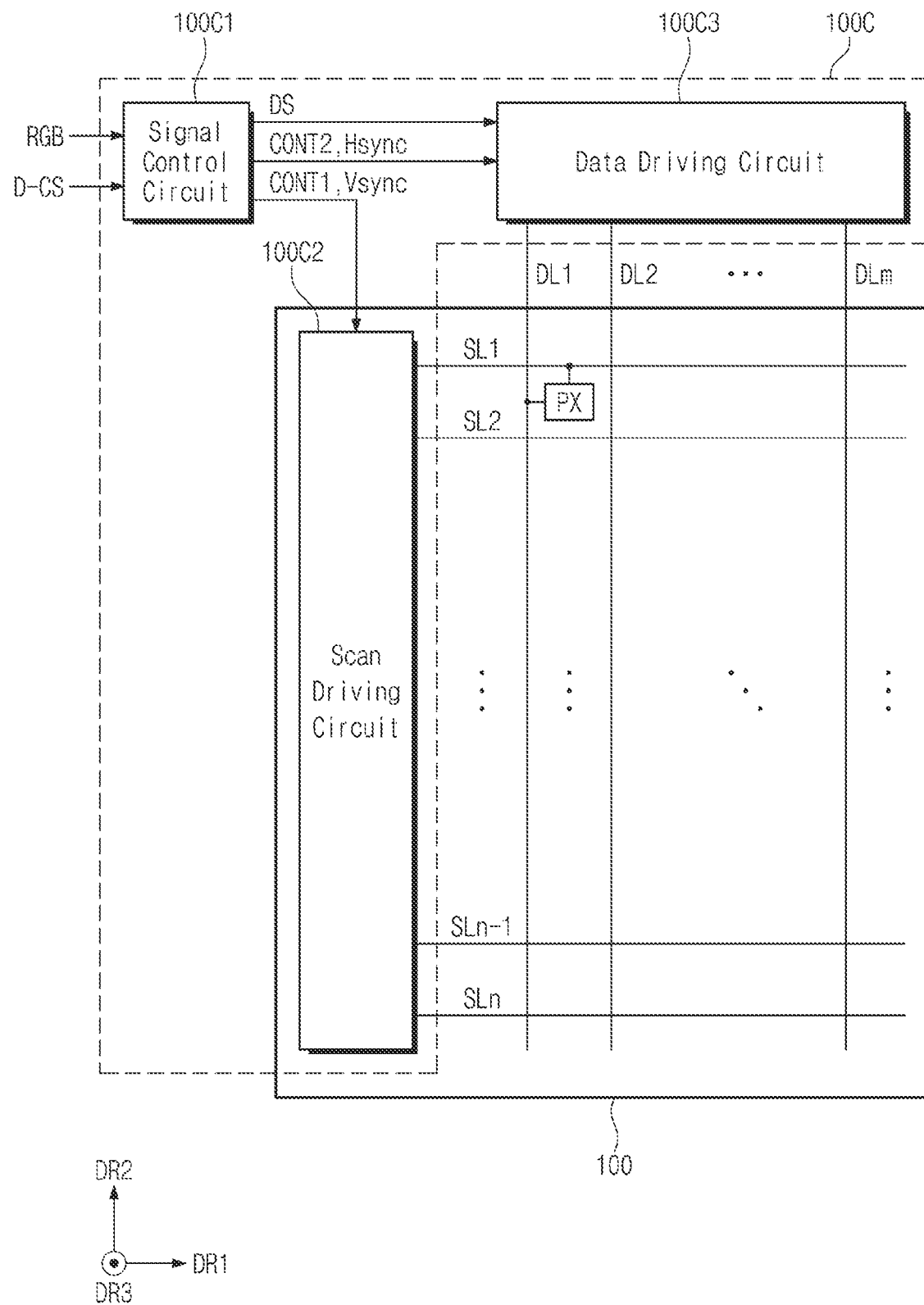
FIG. 5 is a block diagram illustrating a display layer and a display driving unit according to an embodiment of the present disclosure.

FIG. 5 is a block diagram illustrating the display layer 100 and the display driving unit 100C according to an embodiment of the present disclosure.

Referring to FIG. 5, the display layer 100 may include a plurality of scan lines SL1 to SLn (n being an integer of 2 or more), a plurality of data lines DL1 to DLm (m being an integer of 2 or more), and a plurality of pixels PX. Each of the plurality of pixels PX is connected with a corresponding data line of the plurality of data lines DL1 to DLm and may be connected with a corresponding scan line of the plurality of scan lines SL1 to SLn. In an embodiment of the present disclosure, the display layer 100 may further include light emission control lines, and the display driving unit 100C may further include a light emission driving circuit that provides control signals to the light emission control lines. However, a configuration of the display layer 100 is not specifically limited to that described above.

Each of the plurality of scan lines SL1 to SLn may extend in the first direction DR1, and the plurality of scan lines SL1 to SLn may be arranged to be spaced from each other in the second direction DR2. Each of the plurality of data lines DL1 to DLm may extend in the second direction DR2, and the plurality of data lines DL1 to DLm may be arranged to be spaced from each other in the first direction DR1.

The display driving unit 100C may include a signal control circuit 100C1, a scan driving circuit 100C2, and a data driving circuit 100C3.

The signal control circuit 100C1 may receive the image data RGB and the control signal D-CS from the main driving unit 1000C (refer to FIG. 2). The control signal D-CS may include various signals. For example, the control signal D-CS may include an input vertical synchronization signal, an input horizontal synchronization signal, a main clock, a data enable signal, and the like.

The signal control circuit 100C1 may generate a first control signal CONT1 and a vertical synchronization signal Vsync based on the control signal D-CS and may output the first control signal CONT1 and the vertical synchronization signal Vsync to the scan driving circuit 100C2. The vertical synchronization signal Vsync may be included in the first control signal CONT1.

The signal control circuit 100C1 may generate a second control signal CONT2 and a horizontal synchronization signal Hsync based on the control signal D-CS, and may output the second control signal CONT2 and the horizontal synchronization signal Hsync to the data driving circuit 100C3. The horizontal synchronization signal Hsync may be included in the second control signal CONT2.

Also, the signal control circuit 100C1 may provide the data driving circuit 100C3 with a driving signal DS that is obtained by processing the image data RGB so as to be appropriate for an operating condition of the display layer 100. The first control signal CONT1 and the second control signal CONT2 that are signals for operations of the scan driving circuit 100C2 and the data driving circuit 100C3 are not specifically limited.

The scan driving circuit 100C2 drives the plurality of scan lines SL1 to SLn in response to the first control signal CONT1 and the vertical synchronization signal Vsync. In an embodiment of the present disclosure, the scan driving circuit 100C2 may be formed using the same process as the circuit layer 120 (refer to FIG. 4) in the display layer 100, but the present disclosure is not limited thereto. For example, the scan driving circuit 100C2 may be implemented with an integrated circuit (IC) for electrical connection with the display layer 100, the integrated circuit may be directly mounted in a given area of the display layer 100 or may be mounted on a separate printed circuit board in a chip-on-film (COF) manner.

The data driving circuit 100C3 may output gray scale voltages to the plurality of data lines DL1 to DLm in response to the second control signal CONT2, the horizontal synchronization signal Hsync, and the driving signal DS from the signal control circuit 100C1. The data driving circuit 100C3 may be implemented with an integrated circuit for electrical connection with the display layer 100, the integrated circuit may be directly mounted in a given area of the display layer 100 or may be mounted on a separate printed circuit board in the chip-on-film manner, but the present disclosure is not limited thereto. For example, the data driving circuit 100C3 may be formed using the same process as the circuit layer 120 (refer to FIG. 4) in the display layer 100.

Figure 6:
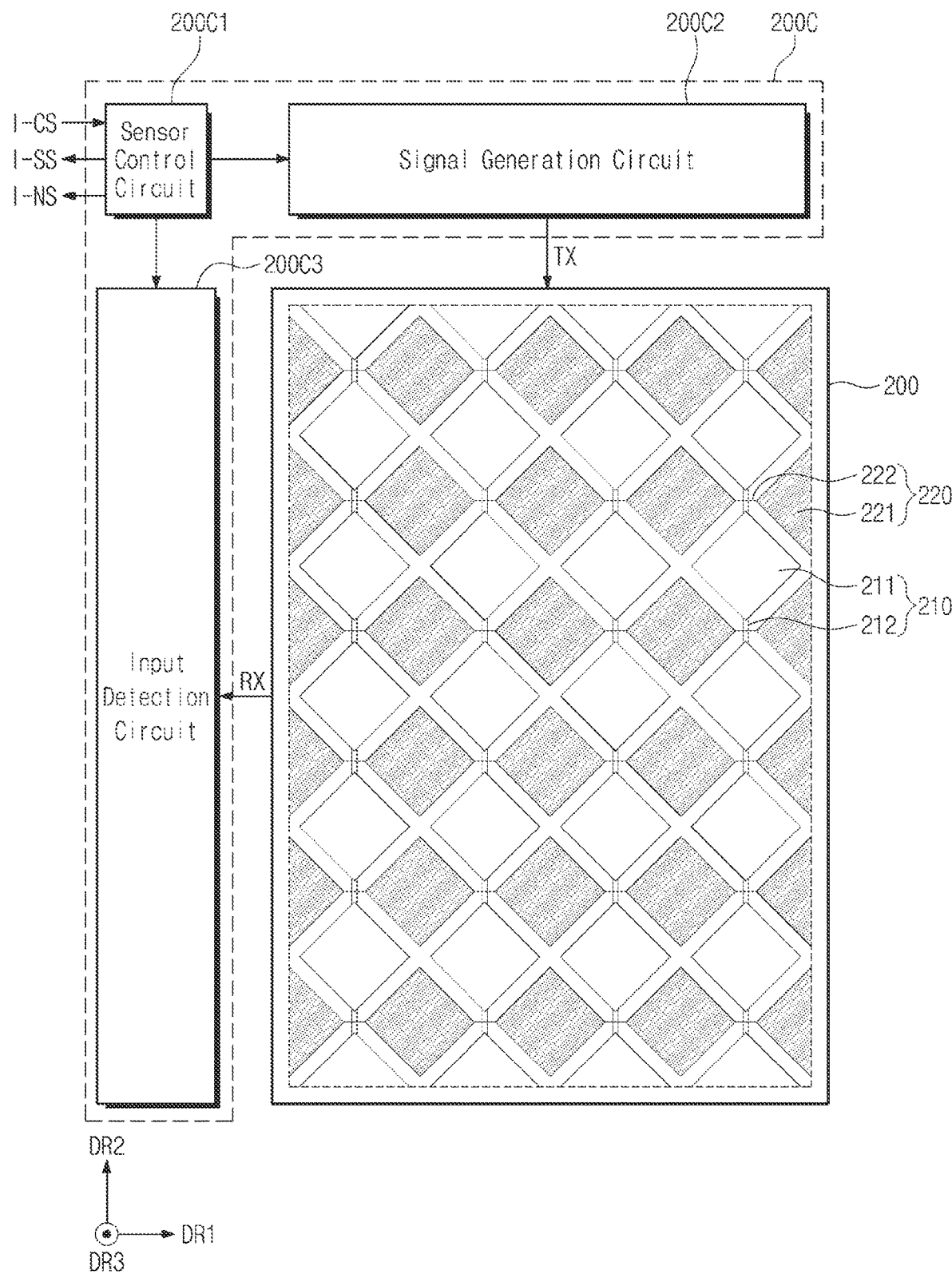
FIG. 6 is a block diagram of a sensor layer and a sensor driving unit according to an embodiment of the present disclosure.

FIG. 6 is a block diagram illustrating the sensor layer 200 and the sensor driving unit 200C according to an embodiment of the present disclosure.

Referring to FIG. 6, the sensor layer 200 may include a plurality of first electrodes 210 and a plurality of second electrodes 220. Each of the plurality of second electrodes 220 may intersect the plurality of first electrodes 210. The sensor layer 200 may further include a plurality of signal lines connected with the plurality of first electrodes 210 and the plurality of second electrodes 220.

Each of the plurality of first electrodes 210 may extend in the second direction DR2, and the plurality of first electrodes 210 may be arranged to be spaced from each in the first direction DR1. Each of the plurality of second electrodes 220 may extend in the first direction DR1, and the plurality of second electrodes 220 may be arranged to be spaced from each in the second direction DR2.

Each of the plurality of first electrodes 210 may include a sensing pattern 211 and a bridge pattern 212. Two sensing patterns 211 that are adjacent to each other may be electrically connected with each other by two bridge patterns 212, but the present disclosure is not particularly limited thereto. The sensing pattern 211 may be included in the second conductive layer 204 (refer to FIG. 4), and the bridge pattern 212 may be included in the first conductive layer 202 (refer to FIG. 4).

Each of the plurality of second electrodes 220 may include a first portion 221 and a second portion 222. The first portion 221 and the second portion 222 may have an integrated shape and may be disposed in the same layer. For example, a single unitary layer may include the first portion 221 and the second portion 222. For example, the first portion 221 and the second portion 222 may be included in the second conductive layer 204 (refer to FIG. 4). Two bridge patterns 212 may be insulated from the second portion 222 and may intersect the second portion 222.

The sensor driving unit 200C may selectively operate in a first mode (or referred to as a "proximity sensing mode") or a second mode (or referred to as a "touch sensing mode") different from the first mode. The sensor driving unit 200C may receive the control signal I-CS from the main driving unit 1000C (refer to FIG. 2). In the first mode, the sensor driving unit 200C may provide the main driving unit 1000C (refer to FIG. 2) with the event signal I-NS by the spaced object 3000. In the second mode, the sensor driving unit 200C may provide the main driving unit 1000C (refer to FIG. 2) with the coordinate signal I-SS. In an embodiment, the sensor driving unit 200C provides information (e.g., the event signal I-NS) on objects that are brought near the sensor layer 200 in the proximity sensing mode, and sensor driving unit 200C provides information (e.g., coordinate signal I-SS) based on a touch of the sensor layer 200 by a finger, pen, stylus, etc.

The sensor driving unit 200C may be implemented with an integrated circuit (IC) for electrical connection with the sensor layer 200. The integrated circuit may be directly mounted in a given area of the sensor layer 200 or may be mounted on a separate printed circuit board in a chip-on-film (COF) manner.

The sensor driving unit 200C may include a sensor control circuit 200C1, a signal generation circuit 200C2, and an input detection circuit 200C3. The sensor control circuit 200C1 may control operations of the signal generation circuit 200C2 and the input detection circuit 200C3 based on the control signal I-CS.

The signal generation circuit 200C2 may output transmit signals TX to the first electrodes 210 of the sensor layer 200. The input detection circuit 200C3 may receive sensing signals RX from the sensor layer 200. For example, the input detection circuit 200C3 may receive the sensing signals RX from the second electrodes 220. For example, the input detection circuit 200C3 may receive the sensing signals RX in response to output of the transmit signals TX.

The input detection circuit 200C3 may convert an analog signal into a digital signal. For example, the input detection circuit 200C3 amplifies a received analog signal and then filters the amplified signal. That is, the input detection circuit 200C3 may convert the filtered signal into a digital signal.

Figure 7A:
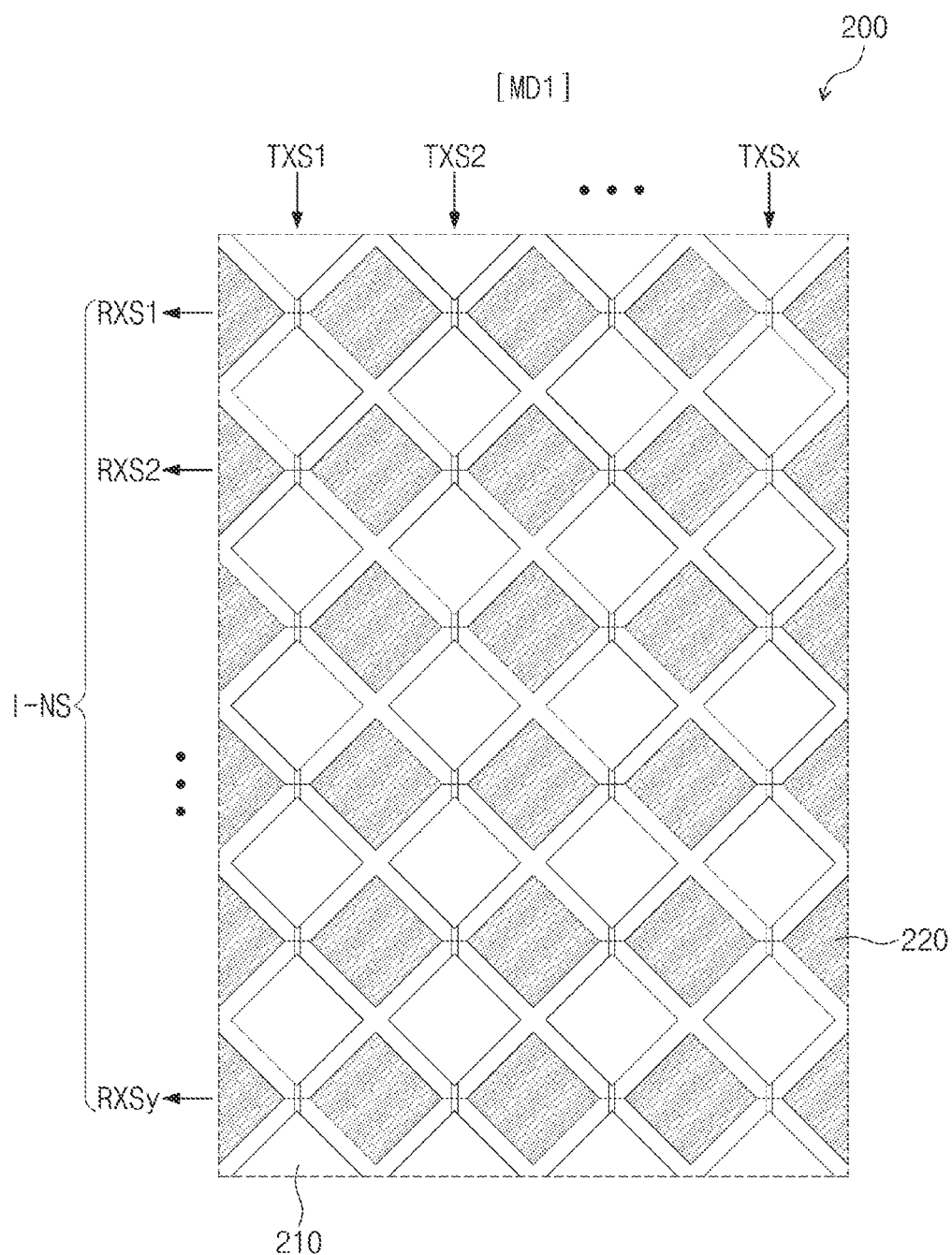
FIG. 7A is a diagram illustrating an operation of a sensor layer according to an embodiment of the present disclosure.
Figure 7B:
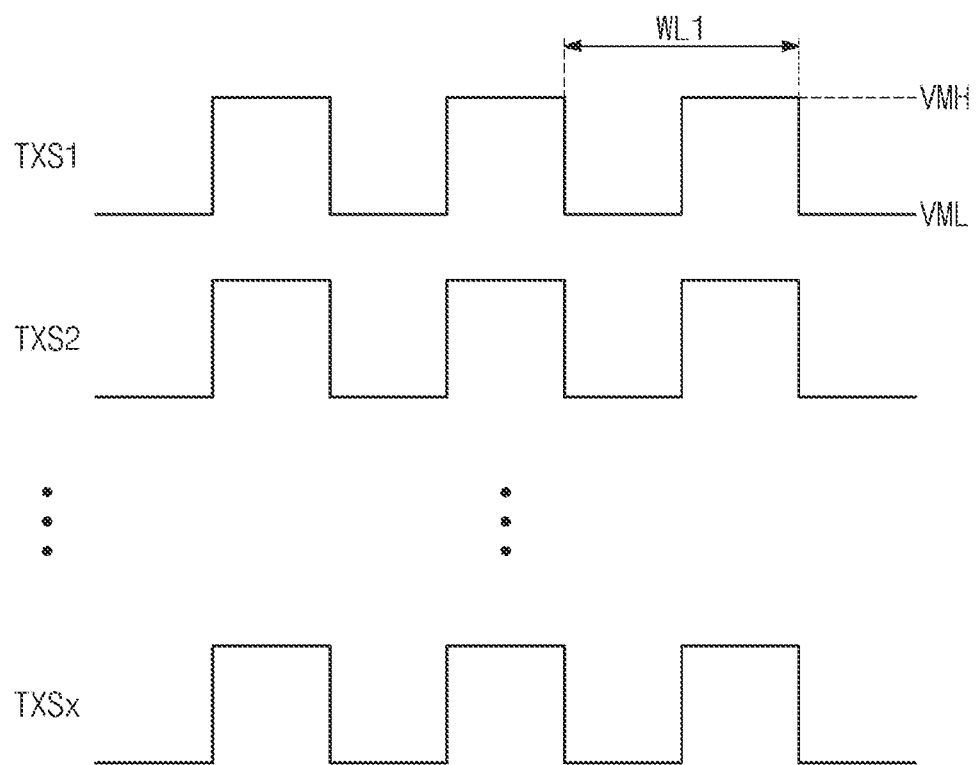
FIG. 7B is a diagram illustrating first transmit signals according to an embodiment of the present disclosure.

FIG. 7A is a diagram illustrating an operation of the sensor layer 200 according to an embodiment of the present disclosure. FIG. 7B is a diagram illustrating first transmit signals TXS1 and TXS2 to TXSx (x being an integer of 3 or more) according to an embodiment of the present disclosure. FIG. 7A shows an operation of the sensor layer 200 when the sensor driving unit 200C operates in a first mode MD1. The first mode MD1 may be referred to as a "proximity sensing mode MD1".

Referring to FIGS. 6, 7A, and 7B, in the first mode MD1, the sensor driving unit 200C may output the plurality of first transmit signals TXS1 and TXS2 to TXSx to the plurality of first electrodes 210, respectively, and may receive first sensing signals RXS1 and RXS2 to RXSy (y being an integer of 3 or more) from the plurality of second electrodes 220, respectively. The sensor driving unit 200C may output the first sensing signals RXS1 and RXS2 to RXSy to the main driving unit 1000C without modification. That is, the event signal I-NS may include the first sensing signals RXS1 and RXS2 to RXSy.

The plurality of first transmit signals TXS1 and TXS2 to TXSx may be simultaneously output to the plurality of first electrodes 210. In an embodiment, the plurality of first transmit signals TXS1 and TXS2 to TXSx are in phase with one another and have the same waveform.

According to an embodiment of the present disclosure, as an intensity of a signal for detecting an object close to the electronic device 1000 (refer to FIG. 1) increases, the signal-to-noise ratio of the first sensing signals RXS1 and RXS2 to RXSy may increase. Accordingly, a proximity sensing recognition distance (or a possible object recognition height) may increase. For example, the possible object recognition height when the plurality of first transmit signals TXS1 and TXS2 to TXSx are used for proximity sensing was measured to be higher as much as about 5 mm than the possible object recognition height when a plurality of second transmit signals TXF1 and TXF2 to TXFx illustrated in FIG. 11B are used for proximity sensing.

In the case of sensing a hovering object, the plurality of first transmit signals TXS1 and TXS2 to TXSx being in phase may be provided to all the first electrodes 210, but the present disclosure is not particularly limited thereto. For example, the sensor layer 200 is divided into a plurality of regions according to a shape of the touch sensor or a shape of the electronic device. The in-phase first transmission signals may be provided to electrodes disposed in one of the plurality of regions. When the in-phase first transmit signals are provided to the partial area, a report rate may be increased.

Figure 8:
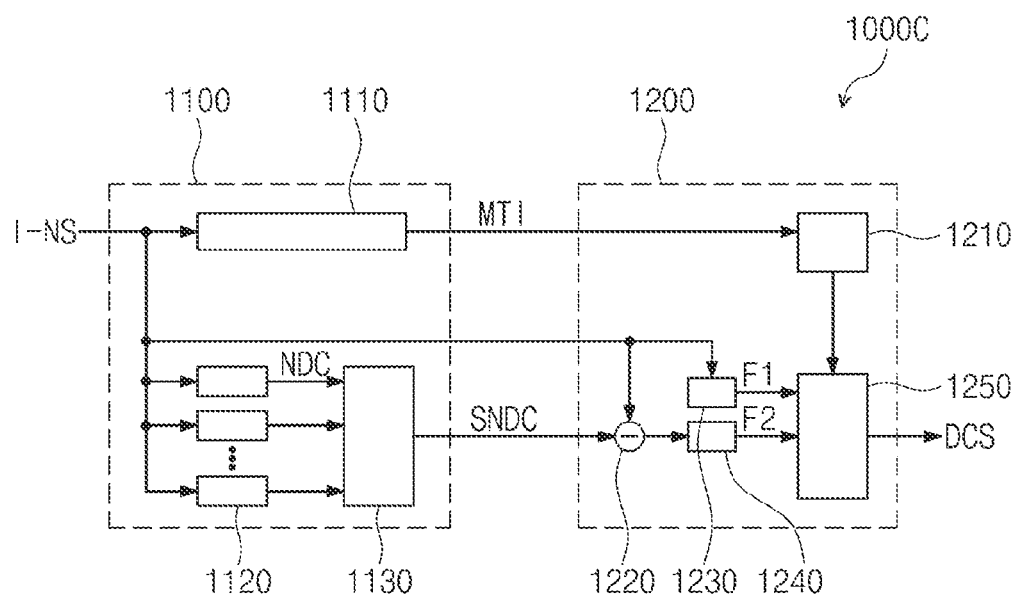
FIG. 8 is a block diagram of a main driving unit according to an embodiment of the present disclosure.
Figure 9:
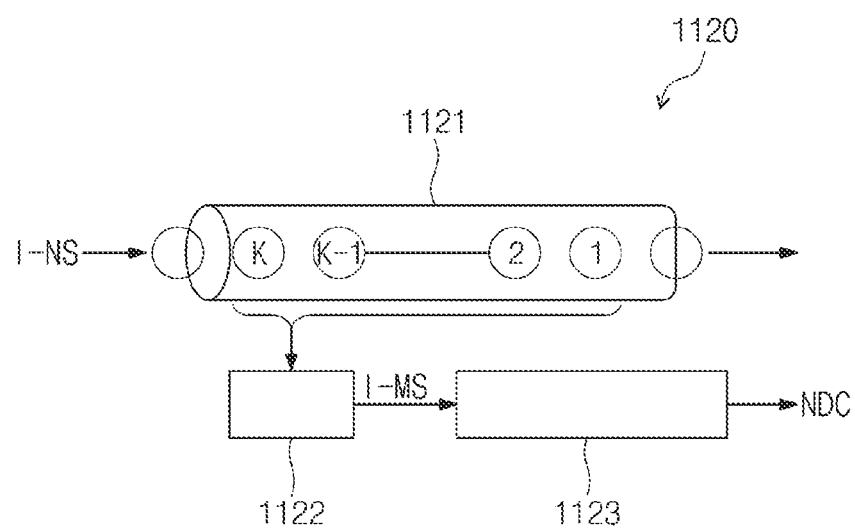
FIG. 9 is a block diagram illustrating a noise prediction model according to an embodiment of the present disclosure.
Figure 10A:
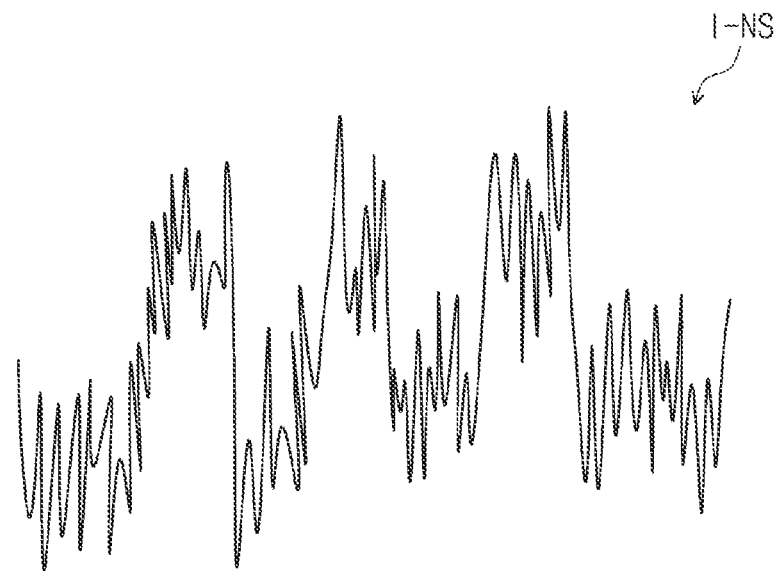
FIG. 10A illustrates a waveform of a signal provided as raw data.
Figure 10B:
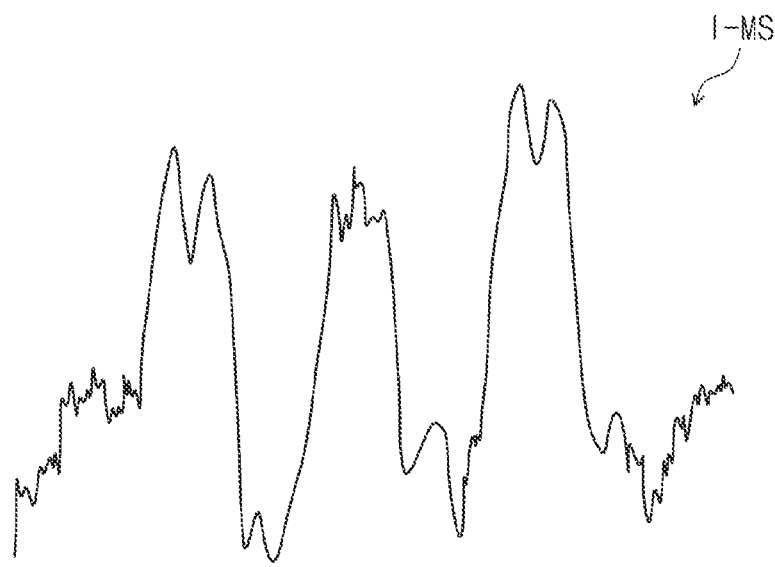
FIG. 10B illustrates a waveform of a signal whose noise is removed by a noise prediction model.
Figure 10C:
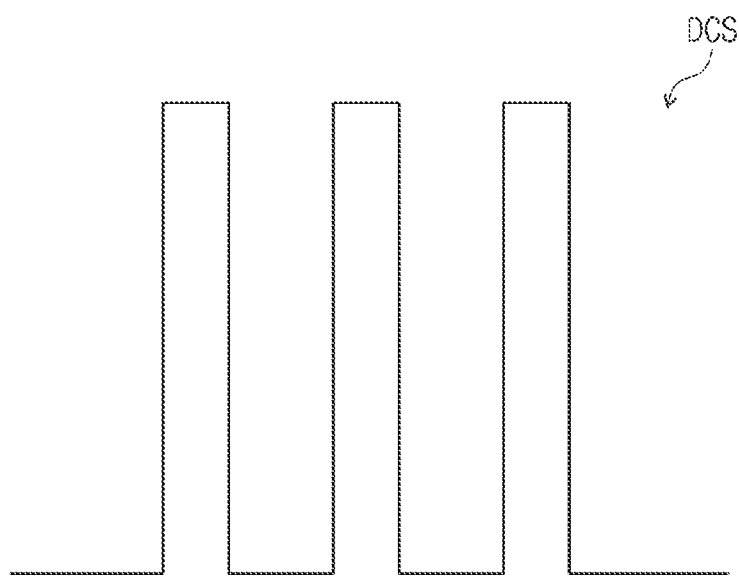
FIG. 10C illustrates a waveform of a signal decided by a decision model.

FIG. 8 is a block diagram of the main driving unit 1000C according to an embodiment of the present disclosure. FIG. 9 is a block diagram illustrating a noise prediction model 1120 according to an embodiment of the present disclosure. FIG. 10A illustrates a waveform of the event signal I-NS provided as raw data. FIG. 10B illustrates a waveform of an intermediate signal I-MS whose noise is removed by a noise model. FIG. 10C illustrates a waveform of a decision signal DCS decided by a decision model.

Referring to FIGS. 7A and 8, an operation for predicting and removing a noise included in the first sensing signals RXS1 and RXS2 to RXSy received in the proximity sensing mode is performed by the main driving unit 1000C. In an embodiment, the operation for predicting and removing the noise is not performed by the sensor driving unit 200C. For example, the main driving unit 1000C may include or have access to an artificial intelligence algorithm. The main driving unit 1000C may predict and remove a noise included in the first sensing signals RXS1 and RXS2 to RXSy by utilizing the artificial intelligence algorithm, and thus, the accuracy of proximity decision may be increased.

For example, the main driving unit 1000C may include a noise model 1100 and a decision model 1200. The noise model 1100 may be trained to predict a noise included in the plurality of first sensing signals RXS1 and RXS2 to RXSy. The decision model 1200 may determine whether an object approaches, based on a selective noise prediction value SNDC output from the noise model 1100 and the plurality of first sensing signals RXS1 and RXS2 to RXSy and may output a decision signal DCS. The selective noise prediction value SNDC may be a noise predicted by the noise model. For example, the decision model 1200 may determine whether an object is close to the electronic device 1000 or is within a certain distance from the electronic device 1000. For example, the selective noise prediction value SNDC may be a value that represents a level of noise.

The noise model 1100 may include a noise experience indicator 1110, a plurality of noise prediction models 1120, and a selector 1130. The decision model 1200 may include a QoS controller 1210, a subtractor 1220, an absolute strength indicator 1230, a relative strength indicator 1240, and a result decision model 1250.

The noise experience indicator 1110 (e.g., a logic circuit) may receive the event signal I-NS and may provide meta information MTI about the event signal I-NS to the decision model 1200. For example, the noise experience indicator 1110 may provide the QoS controller 1210 with the meta information MTI including a change level of data of the event signal I-NS. The QoS controller 1210 (e.g., a control circuit) may determine a noise level based on the meta information MTI; based on a determination result, the QoS controller 1210 may adjust a threshold value of the result decision model 1250 or may provide the result decision model 1250 with a signal for changing logic of the result decision model 1250. Depending on the noise level, the logic of the result decision model 1250 may be changed. For example, the QoS controller 1210 may provide the signal for changing the logic to the result decision model 1250, and the result decision model 1250 may receive the signal and the logic may be changed.

The event signal I-NS, that is, the first sensing signals RXS1 and RXS2 to RXSy may be respectively provided to the plurality of noise prediction models 1120. In an embodiment, each of the noise prediction models 1120 includes an artificial neural network. The plurality of noise prediction models 1120 may respectively output noise signals NDC, which are spatially separated from each other, based on the first sensing signals RXS1 and RXS2 to RXSy. For example, when the number of noise prediction models 1120 is "4", the first sensing signals RXS1 and RXS2 to RXSy may be sequentially divided into four groups, and thus, the noise signals NDC corresponding thereto may be output.

Referring to FIG. 9, each of the noise prediction models 1120 may include a moving window 1121, a moving averaging unit 1122, and a noise predictor 1123.

Signal sets corresponding to a plurality of frames may be input to the moving window 1121. For example, the first sensing signals RXS1 and RXS2 to RXSy respectively corresponding to a first frame to a K-th frame may be input to the moving window 1121. That is, the event signals I-NS respectively corresponding to the first frame to the K-th frame may be input to the moving window 1121.

The moving averaging unit 1122 (e.g., a logic circuit) may calculate a moving average of the event signals I-NS input in a time-series manner to generate a first correction value. For example, the intermediate signal I-MS output from the moving averaging unit 1122 may be a noise-free signal and may correspond to the intermediate signal I-MS illustrated in FIG. 10B. The intermediate signal I-MS may be a signal that is obtained by removing a data outlier from the event signals I-NS. For example, the intermediate signal I-MS may be generated from the moving average.

The intermediate signal I-MS output from the moving averaging unit 1122 may be input to the noise predictor 1123 to which the artificial intelligence algorithm is applied, and the noise prediction value NDC may be output based on the intermediate signal I-MS. In an embodiment, the noise predictor 1123 includes an artificial neural network to execute the artificial intelligence algorithm.

The noise predictor 1123 may predict a noise of a sensor output by learning a noise for each user environment and display screen by using the artificial intelligence algorithm. The deep learning that is a type of artificial neural network may be used as the artificial intelligence algorithm. For example, the neural network may include a convolutional neural network. Alternatively, a regression algorithm of the machine learning may be used. An environment in which a temperature changes, an environment in which humidity changes, an environment at a specific temperature, or an environment at a specific humidity may be considered as the user environment. A display screen including a specific color, a display screen including a specific luminance, or a display screen including various colors may be considered as the display screen.

The noise predictor 1123 may be trained using various methods. For example, a method in which the noise predictor 1123 is trained in advance and weights corresponding to a training result are stored in the noise predictor 1123, or a method in which the noise predictor 1123 is trained in real time based on pieces of data in the moving window 1121 may be used.

Returning to FIG. 8, the selector 1130 may receive the noise prediction values NDC respectively output from the plurality of noise prediction models 1120. That is, the plurality of noise prediction values NDC may be provided to the selector 1130. The selector 1130 may select one of the plurality of noise prediction values NDC as the selective noise prediction value SNDC and may output the selected noise prediction value SNDC to the decision model 1200. For example, the selector 1130 may select a maximum value or a minimum value of the plurality of noise prediction values NDC or an intermediate value of the remaining noise prediction values except for the maximum value and the minimum value as the selective noise prediction value SNDC. For example, a logic circuit and/or a comparator may be used to implement the selector 1130. A value that is selected as the selective noise prediction value SNDC may be variously changed or modified, and is not limited to the above example.

The subtractor 1220 may remove a noise from the event signal I-NS by subtracting the selective noise prediction value SNDC from the event signal I-NS. The subtractor 1220 may provide the relative strength indicator 1240 (e.g., a logic circuit) with a signal that is obtained by subtracting the selective noise prediction value SNDC from the event signal I-NS.

The relative strength indicator 1240 may determine whether a proximity sensing has occurred, based on a pure signal being a result of subtracting the selective noise prediction value SNDC from the event signal I-NS and may output a second signal F2 corresponding to a determination result to the result decision model 1250.

The absolute strength indicator 1230 (e.g., a logic circuit) may receive the event signal I-NS. The absolute strength indicator 1230 may process the event signal I-NS, that is, raw data without modification. The absolute strength indicator 1230 may determine whether proximity sensing has occurred, based on the event signal I-NS and may output a first signal F1 corresponding to a determination result to the result decision model 1250.

The result decision model 1250 may finally determine whether an object approaches, based on the first signal F1 and the second signal F2 and may output the decision signal DCS. For example, if the result decision model 1250 determines that the object has been brought within a certain distance of the device 1000 based on the first signal F1 and the second signal F2, the decision signal DCS is set to a first value. For example, if the result decision model 1250 determines that the object has not been brought within the certain distance, the decision signal DCS is set to a second value different from the first value. Referring to FIG. 10C, the decision signal DCS may be in the shape of a square wave.

An operation of the result decision model 1250 may be controlled by the QoS controller 1210. The result decision model 1250 may determine whether an object approaches, based on the first signal F1 and the second signal F2 depending on the adjusted threshold value according to the noise level or the determined logic according to the noise level and may output the decision signal DCS. For example, the result decision model 1250 may compare the first signal F1 and the second signal F2 with an adjusted threshold value to determine whether the object approaches. Alternatively, the result decision model 1250 may determine whether an object approaches by calculating the first signal F1 and the second signal F2 according to the determined logic.

The artificial intelligence algorithm may be applicable to the result decision model 1250. For example, to finally determine whether an object approaches, a decision tree or a support vector machine (SVM) being an algorithm for classification may be applied to the result decision model 1250. Compared to heuristic models that require developers to set parameters or thresholds in advance, performance may be increased when determining whether an object approaches, by using the artificial intelligence algorithm.

Figure 11A:
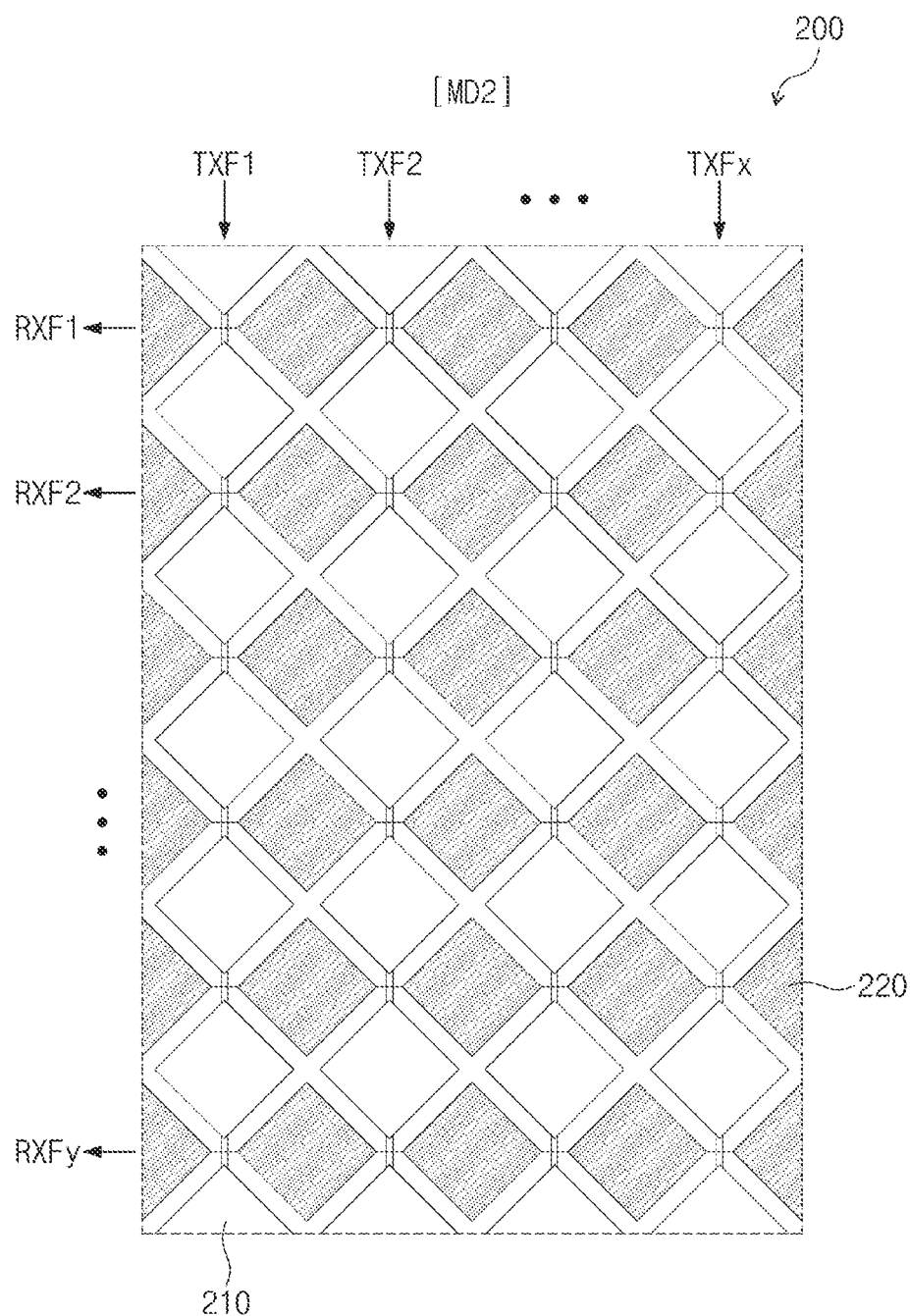
FIG. 11A is a diagram illustrating an operation of a sensor layer according to an embodiment of the present disclosure.
Figure 11B:
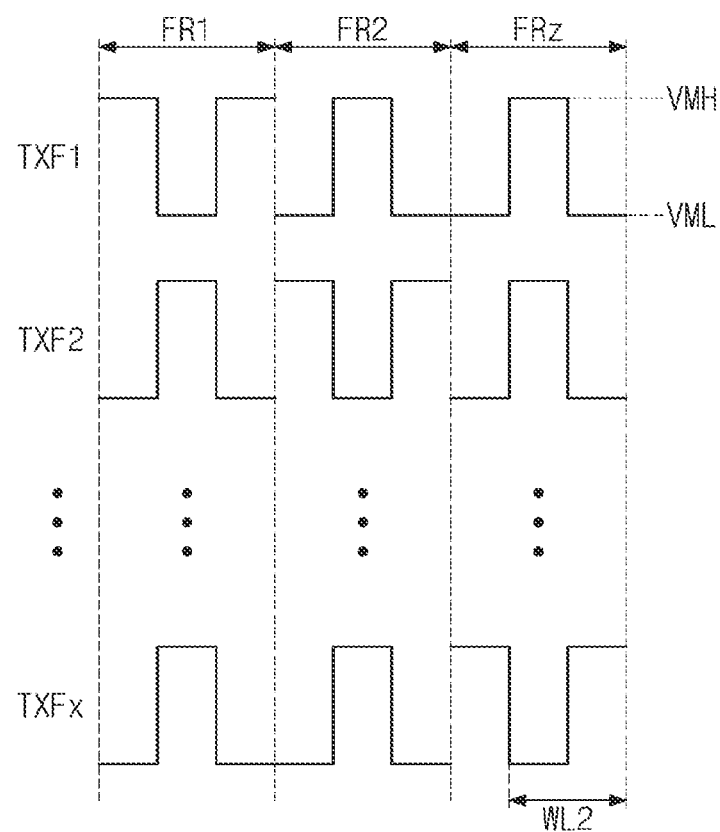
FIG. 11B is a diagram illustrating second transmit signals according to an embodiment of the present disclosure.

FIG. 11A is a diagram illustrating an operation of the sensor layer 200 according to an embodiment of the present disclosure. FIG. 11B is a diagram illustrating the second transmit signals TXF1 and TXF2 to TXFx according to an embodiment of the present disclosure. FIG. 11A shows an operation of the sensor layer 200 when the sensor driving unit 200C operates in a second mode MD2. The second mode MD2 may be referred to as a "touch sensing mode MD2".

Referring to FIGS. 6, 11A, and 11B, in the second mode MD2, the sensor driving unit 200C may output the plurality of second transmit signals TXF1 and TXF2 to TXFx to the plurality of first electrodes 210, respectively, and may receive second sensing signals RXF1 and RXF2 to RXFy from the plurality of second electrodes 220, respectively.

The sensor driving unit 200C may provide the main driving unit 1000C with the coordinate signal I-SS obtained based on the plurality of second sensing signals RXF1 and RXF2 to RXFy. A data amount of the coordinate signal I-SS may be smaller than a data amount of the event signal I-NS. In an embodiment, a size of data within the coordinate signal I-SS is smaller than a size of data within the event signal I-NS.

The second transmit signals TXF1 and TXF2 to TXFx that are provided for each of three frames FR1, FR2, and FRz (z being an integer of 3 or more) are illustrated in FIG. 11B. An example in which a third frame to a (z−1)-th frame between the second frame F2 and the z-th frame FRz are omitted is illustrated.

In the first frame FR1, a first phase of one second transmit signal TXF1 of the plurality of second transmit signals TXF1 and TXF2 to TXFx may be different from a second phase of the remaining second transmit signals TXF2 to TXFx. In the second frame FR2, a first phase of one second transmit signal TXF2 of the plurality of second transmit signals TXF1 and TXF2 to TXFx may be different from a second phase of the remaining second transmit signals. In the z-th frame FRz, a first phase of one second transmit signal TXFz of the plurality of second transmit signals TXF1 and TXF2 to TXFx may be different from a second phase of the remaining second transmit signals. For example, a difference between the first phase and the second phase may be 180 degrees.

Even though the plurality of second transmit signals TXF1 and TXF2 to TXFx are simultaneously output to the plurality of first electrodes 210 in the second mode MD2, in each frame, a phase of one second transmit signal of the plurality of second transmit signals TXF1 and TXF2 to TXFx may be different from a phase of the remaining second transmit signals. Accordingly, upon decoding the plurality of second sensing signals RXF1 and RXF2 to RXFy, because it is possible to detect a capacitance change value for each of nodes (e.g., points) located between the first electrodes 210 and the second electrodes 220, a two-dimensional (2D) coordinate value may be obtained. For example, the 2D coordinate value may include an X and Y coordinate value.

Referring to FIGS. 7B and 11B, a driving voltage of the plurality of first transmit signals TXS1 and TXS2 to TXSx may be the same as or substantially the same as a driving voltage of the plurality of second transmit signals TXF1 and TXF2 to TXFx. For example, a high-level voltage VMH of the plurality of first transmit signals TXS1 and TXS2 to TXSx may be equal to a high-level voltage VMH of the plurality of second transmit signals TXF1 and TXF2 to TXFx. Also, a low-level voltage VML of the plurality of first transmit signals TXS1 and TXS2 to TXSx may be equal to a low-level voltage VML of the plurality of second transmit signals TXF1 and TXF2 to TXFx.

According to an embodiment of the present disclosure, the plurality of first transmit signals TXS1 and TXS2 to TXSx may be provided by using a voltage used in touch sensing, without using a separate higher voltage to increase the sensitivity of proximity sensing. Instead, when the first transmit signals TXS1 and TXS2 to TXSx being in phase are simultaneously provided to the first electrodes 210, an intensity of a signal for detecting an object close to the electronic device 1000 (refer to FIG. 1) may be increased, and thus, the proximity sensing sensitivity may be further improved.

A period WL1 of each of the plurality of first transmit signals TXS1 and TXS2 to TXSx may be longer than a period WL2 of each of the plurality of second transmit signals TXF1 and TXF2 to TXFx. That is, a frequency of each of the plurality of first transmit signals TXS1 and TXS2 to TXSx may be lower than a frequency of each of the plurality of second transmit signals TXF1 and TXF2 to TXFx. Because the frequency of the plurality of first transmit signals TXS1 and TXS2 to TXSx in the proximity sensing mode is relatively low, an absolute value of a digital signal converted from the first sensing signals RXS1 and RXS2 to RXSy sensed from the sensor layer 200 may become greater. Accordingly, the proximity sensing sensitivity in the proximity sensing mode may be increased.

That is, according to an embodiment of the present disclosure, a waveform of the plurality of first transmit signals TXS1 and TXS2 to TXSx may be identical in amplitude to a waveform of the plurality of second transmit signals TXF1 and TXF2 to TXFx, and the plurality of first transmit signals TXS1 and TXS2 to TXSx may be different in frequency and period from the plurality of second transmit signals TXF1 and TXF2 to TXFx.

Figure 12:
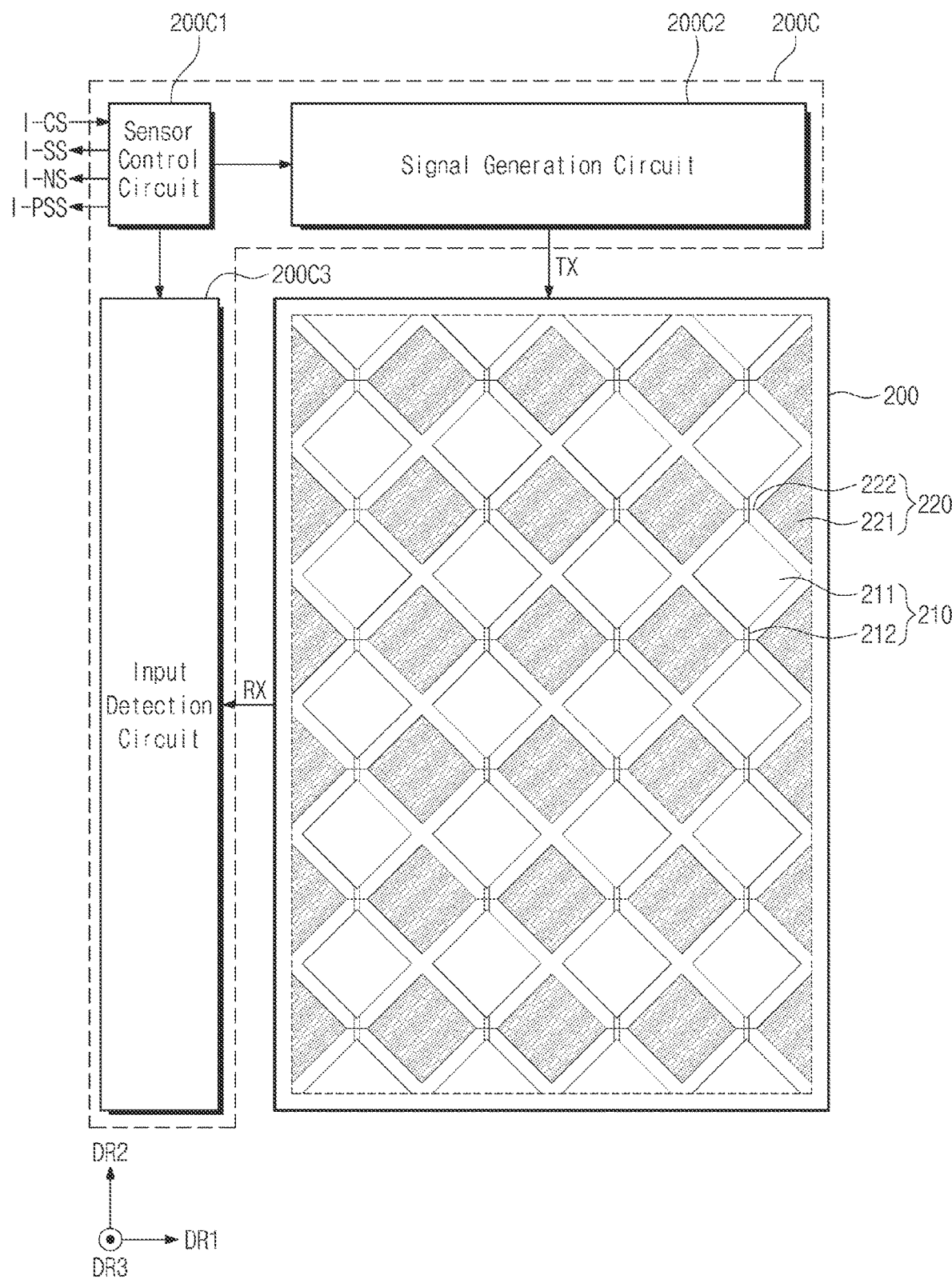
FIG. 12 is a block diagram illustrating a sensor layer and a sensor driving unit according to an embodiment of the present disclosure.

FIG. 12 is a block diagram illustrating the sensor layer 200 and the sensor driving unit 200C according to an embodiment of the present disclosure. In the description of FIG. 12, a difference with FIG. 6 will be described, and the same components are marked by the same reference numerals, and thus, additional description will be omitted to avoid redundancy.

Referring to FIG. 12, the sensor driving unit 200C may selectively operate in a first sub mode (or referred to as a "proximity sensing mode"), a second sub mode (or a proximity coordinate sensing mode), or a second mode (or referred to as a "touch sensing mode").

The sensor driving unit 200C may receive the control signal I-CS from the main driving unit 1000C (refer to FIG. 2). In the first sub mode, the sensor driving unit 200C may provide the main driving unit 1000C (refer to FIG. 2) with the event signal I-NS by the spaced object 3000 (refer to FIG. 2). In the second sub mode, the sensor driving unit 200C may provide the main driving unit 1000C (refer to FIG. 2) with a proximity coordinate signal I-PSS by the spaced object 3000. In the second mode, the sensor driving unit 200C may provide the main driving unit 1000C (refer to FIG. 2) with the coordinate signal I-SS.

Figure 13A:
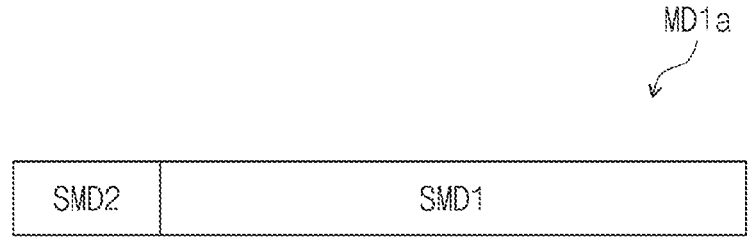
FIG. 13A is a diagram illustrating sub modes included in a first mode according to an embodiment of the present disclosure.

FIG. 13A is a diagram illustrating sub modes SMD1 and SMD2 included in a first mode MD1a according to an embodiment of the present disclosure.

Referring to FIGS. 12 and 13a, the first mode MD1a may include a first sub mode SMD1 and a second sub mode SMD2. In the first sub mode SMD1, the sensor driving unit 200C may output the event signal I-NS to the main driving unit 1000C (refer to FIG. 2). In the second sub mode SMD2, the sensor driving unit 200C may output the proximity coordinate signal I-PSS to the main driving unit 1000C (refer to FIG. 2).

The first sub mode SMD1 may be the same as or substantially the same as the first mode MD1 described with reference to FIGS. 7A and 7B. In the case of the proximity sensing, because it is sufficient to determine only the approach of a large-area conductor, only the first sub mode SMD1, that is, the first mode MD1 described with reference to FIGS. 7A and 7B may be sufficient. Nevertheless, in the case where the first mode MD1a further includes the second sub mode SMD2 for sensing coordinate information about proximity sensing, it may be possible to additionally implement various functions by using the second sub mode SMD2, and thus, various demands of the user may be satisfied.

In the first mode MD1a, the sensor layer 200 and the sensor driving unit 200C may operate in the second sub mode SMD2 and may then continue to operate in the first sub mode SMD1. In the case of the first mode MD1a, a length of an operating period in the first sub mode SMD1 may be longer than a length of an operating period in the second sub mode SMD2. For example, the length of the operating period of the first sub mode SMD1 may be about four times the length of the operating period of the second sub mode SMD2, but the present disclosure is not particularly limited thereto. For example, assuming that a frame rate in the first mode MD1a is 60 Hz (hertz), about 12 ms (milliseconds) of 16.7 ms corresponding to one period may be allocated for the first sub mode SMD1, and about 4 ms thereof may be allocated for the second sub mode SMD2.

Figure 13B:
FIG. 13B is a diagram illustrating sub modes included in a first mode according to an embodiment of the present disclosure.

FIG. 13B is a diagram illustrating sub modes included in a first mode according to an embodiment of the present disclosure.

Referring to FIG. 13B, in a first mode MD1b, the sensor layer 200 and the sensor driving unit 200C may operate in the first sub mode SMD1 and may then continue to operate in the second sub mode SMD2. In the case of the first mode MD1b, a length of an operating period in the first sub mode SMD1 may be longer than a length of an operating period in the second sub mode SMD2.

Figure 14A:
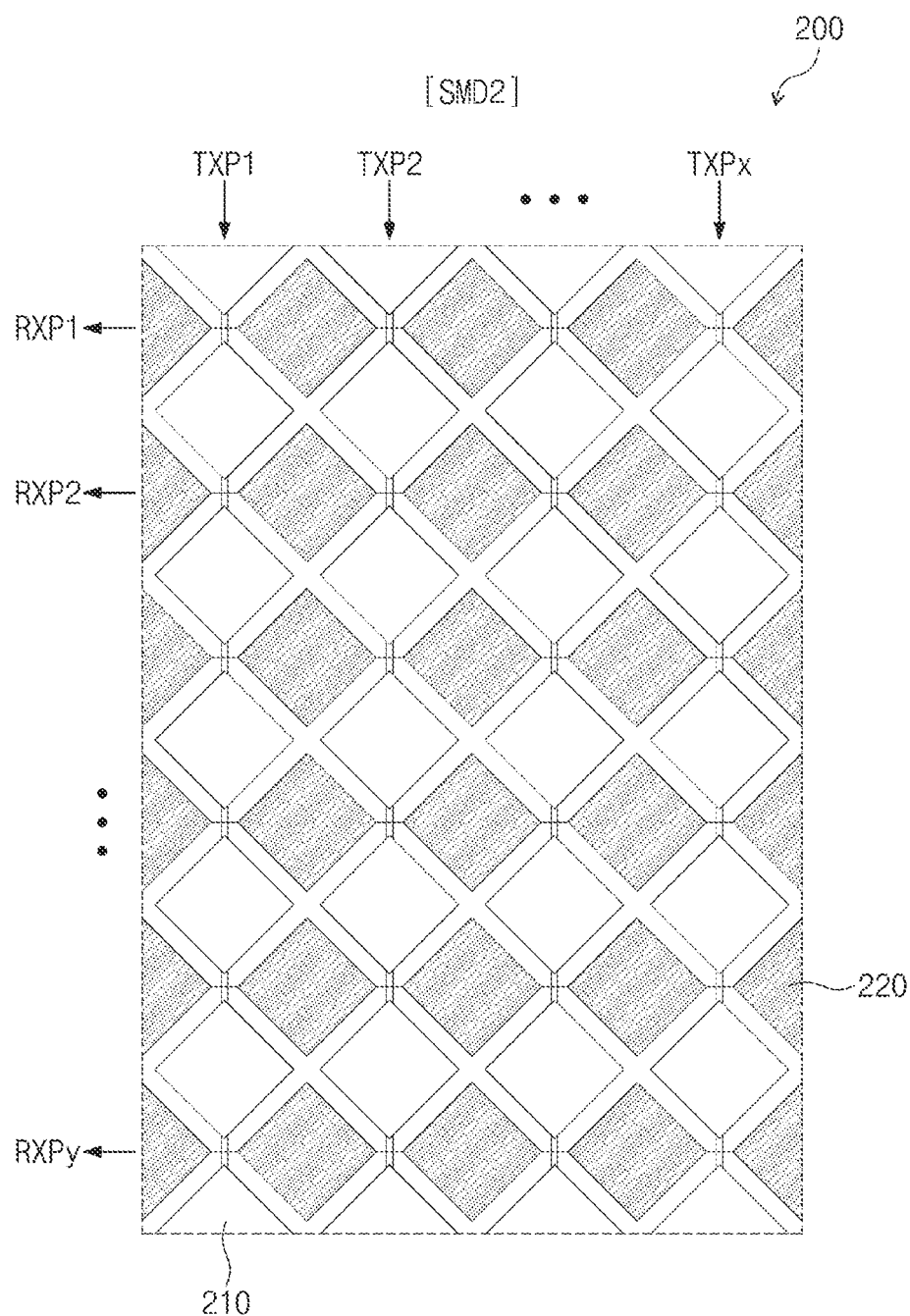
FIG. 14A is a diagram illustrating an operation of a sensor layer according to an embodiment of the present disclosure.
Figure 14B:
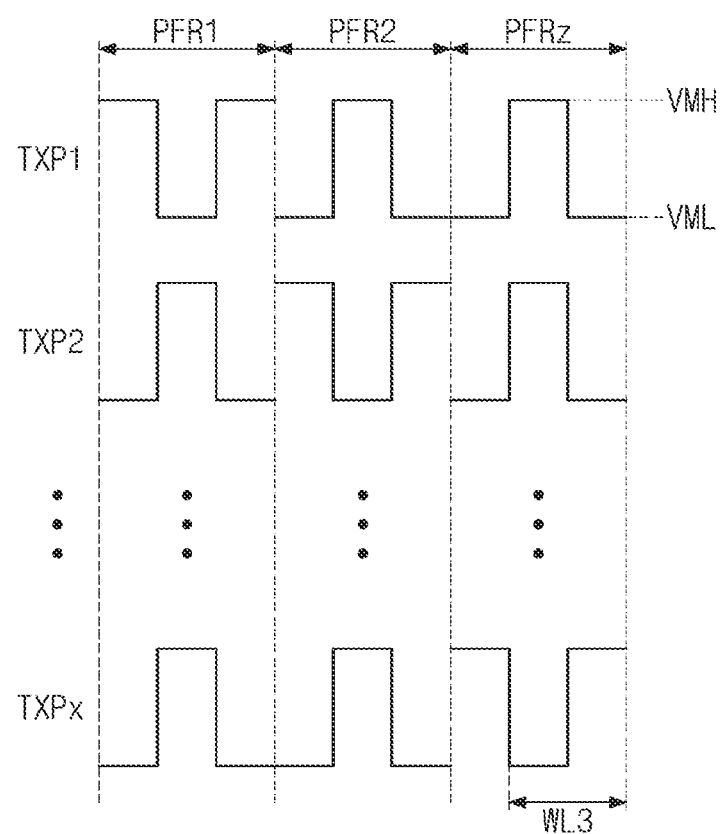
FIG. 14B illustrates third transmit signals according to an embodiment of the present disclosure.

FIG. 14A is a diagram illustrating an operation of the sensor layer 200 according to an embodiment of the present disclosure. FIG. 14B is a diagram illustrating third transmit signals TXP1 and TXP2 to TXPx according to an embodiment of the present disclosure. FIG. 14A shows an operation of the sensor layer 200 when the sensor driving unit 200C operates in the second sub mode SMD2. The second sub mode SMD2 may be referred to as a "proximity coordinate sensing mode SMD2".

Referring to FIGS. 12, 14A, and 14B, in the second sub mode SMD2, the sensor driving unit 200C may output the plurality of third transmit signals TXP1 and TXP2 to TXPx to the plurality of first electrodes 210, respectively, and may receive a plurality of third sensing signals RXP1 and RXP2 to RXPy from the plurality of second electrodes 220, respectively. The sensor driving unit 200C may provide the main driving unit 1000C (refer to FIG. 2) with the proximity coordinate signal I-PSS obtained based on the plurality of third sensing signals RXP1 and RXP2 to RXPy.

The plurality of third transmit signals TXP1 and TXP2 to TXPx that are provided for each of the three frames PFR1, PFR2, and PFRz are illustrated in FIG. 14B. An example in which the third frame to the (z−1)-th frame between the second frame PFR2 and the z-th frame PFRz are omitted is illustrated.

In the first frame PFR1, a first phase of one third transmit signal TXP1 of the plurality of third transmit signals TXP1 and TXP2 to TXPx may be different from a second phase of the remaining third transmit signals TXP2 to TXPx. In the second frame PFR2, a first phase of one third transmit signal TXP2 of the plurality of third transmit signals TXP1 and TXP2 to TXPx may be different from a second phase of the remaining third transmit signals. In the z-th frame PFRz, a first phase of one third transmit signal TXPz of the plurality of third transmit signals TXP1 and TXP2 to TXPx may be different from a second phase of the remaining third transmit signals. For example, a difference between the first phase and the second phase may be 180 degrees.

Even though the plurality of the third transmit signals TXP1 and TXP2 to TXPx are simultaneously output to the plurality of first electrodes 210 in the second sub mode SMD2, in each frame, a phase of one third transmit signal of the plurality of third transmit signals TXP1 and TXP2 to TXPx may be different from a phase of the remaining third transmit signals. Accordingly, upon decoding a plurality of third sensing signals RXP1 and RXP2 to RXPy, because it is possible to detect a capacitance change value for each of nodes formed between the first electrodes 210 and the second electrodes 220, a two-dimensional (2D) coordinate value may be obtained. For example, the 2D coordinate value may include an X and Y coordinate value.

Referring to FIGS. 7B and 14B, a driving voltage of the plurality of first transmit signals TXS1 and TXS2 to TXSx may be the same as or substantially the same as a driving voltage of the plurality of third transmit signals TXP1 and TXP2 to TXPx.

To increase the accuracy of determining whether a proximity sensing has occurred, a frequency of the plurality of first transmit signals TXS1 and TXS2 to TXSx in the first sub mode SMD1 (refer to FIG. 13A) may be lower than a frequency of the plurality of third transmit signals TXP1 and TXP2 to TXPx in the second sub mode SMD2. The period WL1 of each of the plurality of first transmit signals TXS1 and TXS2 to TXSx may be longer than a period WL3 of each of the plurality of third transmit signals TXP1 and TXP2 to TXPx. The period WL1 may be about four times the period WL3. However, it may be sufficient that the period WL1 is longer than the period WL3, and the present disclosure is not particularly limited thereto.

That is, according to an embodiment of the present disclosure, a waveform of the plurality of first transmit signals TXS1 and TXS2 to TXSx may be identical in amplitude to a waveform of the plurality of third transmit signals TXP1 and TXP2 to TXPx, and the plurality of first transmit signals TXS1 and TXS2 to TXSx may be different in frequency and period from the plurality of third transmit signals TXP1 and TXP2 to TXPx.

Referring to FIGS. 11B and 14B, the period WL2 of each of the plurality of second transmit signals TXF1 and TXF2 to TXFx may be the same as or substantially the same as the period WL3 of each of the plurality of third transmit signals TXP1 and TXP2 to TXPx. In an embodiment of the present disclosure, a waveform of the plurality of second transmit signals TXF1 and TXF2 to TXFx may be the same or substantially the same as a waveform of the plurality of third transmit signals TXP1 and TXP2 to TXPx. In an embodiment, a frame rate upon operating in the second mode MD2 (refer to FIG. 11A) is different from a frame rate upon operating in the second sub mode SMD2.

According to the above description, in a proximity sensing mode, a sensor driving unit may simultaneously provide first transmit signals being in phase to a plurality of first electrodes of a sensor layer, respectively. In this case, as an intensity of a proximity signal increases, a signal-to-noise ratio may become greater. Accordingly, a proximity sensing recognition distance (or a possible object recognition height) may increase.

Also, since noise learning for each user environment and display screen is performed by using an artificial intelligence technology, it may be possible to predict a noise of a sensing signal and to remove the noise. Also, the artificial intelligence technology may be used even upon determining whether an object approaches, based on the sensing signal and the predicted noise. Accordingly, the performance of proximity decision of an electronic device may be increased.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
a display layer configured to display an image;
a display driving circuit configured to drive the display layer;
a sensor layer disposed on the display layer and including a plurality of first electrodes and a plurality of second electrodes;
a sensor driving circuit configured to drive the sensor layer and to selectively operate in a first mode or a second mode different from the first mode; and
a main driving circuit configured to control an operation of the display driving circuit and an operation of the sensor driving circuit,
wherein, in the first mode, the sensor driving circuit outputs a plurality of first transmit signals to the plurality of first electrodes respectively, receives a plurality of first sensing signals from the plurality of second electrodes respectively, and outputs the plurality of first sensing signals to the main driving circuit,
wherein, in the second mode, the sensor driving circuit outputs a plurality of second transmit signals to the plurality of first electrodes respectively, receives a plurality of second sensing signals from the plurality of second electrodes respectively, and provides the main driving circuit with a coordinate obtained based on the plurality of second sensing signals, and
wherein the plurality of first transmit signals are simultaneously output to the plurality of first electrodes.

2. The electronic device of claim 1, wherein the plurality of first transmit signals are in phase with one another.

3. The electronic device of claim 1, wherein a driving voltage of the plurality of first transmit signals is equal to a driving voltage of the plurality of second transmit signals.

4. The electronic device of claim 1, wherein a first phase of one second transmit signal of the plurality of second transmit signals is different from a second phase of remaining second transmit signals of the plurality of second transmit signals.

5. The electronic device of claim 1, wherein the first mode includes a first sub mode and a second sub mode,
wherein, in the first sub mode, the sensor driving circuit outputs the plurality of first sensing signals to the main driving circuit, and
wherein, in the second sub mode, the sensor driving circuit outputs a plurality of third transmit signals to the plurality of first electrodes respectively, receives a plurality of third sensing signals from the plurality of second electrodes respectively, and provides the main driving circuit with a proximity coordinate obtained based on the plurality of third sensing signals.

6. The electronic device of claim 5, wherein a length of an operating period in the first sub mode is longer than a length of an operating period in the second sub mode.

7. The electronic device of claim 5, wherein a frequency of each of the plurality of third transmit signals is higher than a frequency of each of the plurality of first transmit signals.

8. The electronic device of claim 5, wherein the sensor driving circuit operates in the first sub mode and then continues to operate in the second sub mode or operates in the second sub mode and then continues to operate in the first sub mode.

9. The electronic device of claim 1, wherein the main driving circuit comprises:
a noise model trained to predict a noise included in the plurality of first sensing signals; and
a decision model configured to determine whether an object approaches, based on the noise predicted by the noise model and the plurality of first sensing signals.

10. The electronic device of claim 9, wherein the noise model comprises:
a plurality of noise prediction models configured to respectively output a plurality of noise prediction values; and
a selector configured to select one of the plurality of noise prediction values.

11. The electronic device of claim 10, wherein each of the plurality of noise prediction models comprises:
a moving window configured to receive the plurality of first sensing signals of each of a plurality of frames;
a moving averaging unit configured to calculate a moving average of the plurality of first sensing signals of each of the plurality of frames and to output an intermediate signal; and
a noise predictor configured to output a noise prediction value by using the intermediate signal and a trained algorithm.

12. The electronic device of claim 1, wherein the display layer includes a base layer, a circuit layer disposed on the base layer, a light emitting device layer disposed on the circuit layer, and an encapsulation layer disposed on the light emitting device layer, and
wherein the sensor layer is directly disposed on the display layer.

13. An electronic device comprising:
a sensor layer including a plurality of first electrodes and a plurality of second electrodes;
a sensor driving circuit configured to drive the sensor layer and to selectively operate in a proximity sensing mode or a touch sensing mode; and
a main driving circuit configured to control an operation of the sensor driving circuit,
wherein, in the proximity sensing mode, the sensor driving circuit outputs all of a plurality of first sensing signals received from the plurality of second electrodes to the main driving circuit, and
wherein, in the touch sensing mode, the sensor driving circuit calculates input coordinates based on a plurality of second sensing signals received from the plurality of second electrodes and outputs a coordinate signal including information about the input coordinates to the main driving circuit.

14. The electronic device of claim 13, wherein the main driving circuit comprises:
a noise model trained to predict a noise included in the plurality of first sensing signals; and
a decision model configured to determine whether an object approaches, based on the noise predicted by the noise model and the plurality of first sensing signals.

15. The electronic device of claim 13, wherein, in the proximity sensing mode, the sensor driving circuit simultaneously outputs a plurality of first transmit signals to the plurality of first electrodes respectively and receives the plurality of first sensing signals from the plurality of second electrodes respectively, and
wherein the plurality of first transmit signals are in phase with one another.

16. The electronic device of claim 15, wherein, in the touch sensing mode, the sensor driving circuit simultaneously outputs a plurality of second transmit signals to the plurality of first electrodes respectively and receives the plurality of second sensing signals from the plurality of second electrodes respectively, and
wherein a first phase of one second transmit signal of the plurality of second transmit signals is different from a second phase of the remaining second transmit signals.

17. The electronic device of claim 16, wherein a driving voltage of the plurality of first transmit signals is equal to a driving voltage of the plurality of second transmit signals.

18. The electronic device of claim 15, wherein the sensor driving circuit is configured to selectively operate in one of the proximity sensing mode, the touch sensing mode, or a proximity coordinate sensing mode, and
wherein the sensor driving circuit operates in the proximity sensing mode and then continues to operate in the proximity coordinate sensing mode or operates in the proximity coordinate sensing mode and then continues to operate in the proximity sensing mode.

19. The electronic device of claim 18, wherein, in the proximity coordinate sensing mode, the sensor driving circuit outputs a plurality of third transmit signals to the plurality of first electrodes respectively, receives a plurality of third sensing signals from the plurality of second electrodes respectively, and provides the main driving circuit with a proximity coordinate signal obtained based on the plurality of third sensing signals.

20. The electronic device of claim 19, wherein a length of an operating period in the proximity sensing mode is longer than a length of an operating period in the proximity coordinate sensing mode, and a frequency of each of the plurality of third transmit signals is higher than a frequency of each of the plurality of first transmit signals.

* * * * *